(12) United States Patent
Kim

(10) Patent No.: US 7,831,904 B2
(45) Date of Patent: Nov. 9, 2010

(54) METHOD OF CREATING AN XML DOCUMENT ON A WEB BROWSER

(75) Inventor: Youngkun Kim, Seoul (KR)

(73) Assignee: 3KSoftware LLC, Pittsburgh, PA (US)

( * ) Notice: Subject to any disclaimer, the term of this patent is extended or adjusted under 35 U.S.C. 154(b) by 1030 days.

(21) Appl. No.: 11/568,921

(22) PCT Filed: Jun. 15, 2004

(86) PCT No.: PCT/KR2004/001418

§ 371 (c)(1),
(2), (4) Date: Nov. 10, 2006

(87) PCT Pub. No.: WO2005/111844

PCT Pub. Date: Nov. 24, 2005

(65) Prior Publication Data

US 2008/0195934 A1    Aug. 14, 2008

(30) Foreign Application Priority Data

May 14, 2004    (KR) ...................... 10-2004-0034358

(51) Int. Cl.
*G06F 17/00* (2006.01)
(52) U.S. Cl. ................................... 715/234
(58) Field of Classification Search ................. 715/234
See application file for complete search history.

(56) References Cited

U.S. PATENT DOCUMENTS

| | | | |
|---|---|---|---|
| 6,487,566 B1 | 11/2002 | Sundaresan | |
| 6,590,589 B1 | 7/2003 | Sluiman et al. | |
| 6,654,734 B1 | 11/2003 | Mani et al. | |
| 6,681,223 B1 | 1/2004 | Sundaresan | |
| 6,718,516 B1 | 4/2004 | Claussen et al. | |
| 6,941,510 B1 * | 9/2005 | Ozzie et al. | 715/234 |
| 2004/0030758 A1 * | 2/2004 | Cherdron et al. | 709/218 |

FOREIGN PATENT DOCUMENTS

| | | | |
|---|---|---|---|
| JP | 2003-281128 A | 10/2003 | |
| KR | 2002-69795 A | 9/2002 | |
| KR | 2002-61887 A | 7/2005 | |

OTHER PUBLICATIONS

Hori, et al., "Annotation-based Web content transcoding", Computer Networks 33, published 2000, p. 197-211.*
Estievenart, et al., "A tool-supported method to extract data and schema from web sites", Proceedings of the Fifth IEEE International Workshop on Web Site Evolution (WSE'03), published 2003, IEEE, p. 1-9.*
Ciancarini, et al., "Managing Complex Documents Over the WWW: A Case Study for XML", IEEE Transactions on Knowledge and Data Engineering, vol. 11, No. 4, Jul./Aug. 1999, p. 629-638.*
Perry, Russell et al. Architecture and Design of an XML Application Platform, Digital Media Systems Laboratory, HP Laboratories Bristol, Feb. 19, 2004 p. 32, Line 1 to p. 37, Line 7.

* cited by examiner

*Primary Examiner*—Amelia Rutledge
(74) *Attorney, Agent, or Firm*—Cohen & Grigsby, P.C.

(57) ABSTRACT

The invention concerns a method of creating an XML document on a web browser. The method according to the invention comprises the steps of: receiving data input from a web browser; duplicating a source XML document stored in advance, the source XML document including predefined structures and predetermined source data; replacing the source data included in the duplicated XML document by the received input data; and storing the XML document resulted in the above replacing step as a new XML document. According to the invention, an ordinary user can easily create XML documents in a given form, e.g., resumes, commercial agreement sheets, official documents, etc., using only current web browsers widely used, without a specified XML editor.

15 Claims, 24 Drawing Sheets

FIG.18

| Web Form Type | | without Schema File | with Schema File | Data Type |
|---|---|---|---|---|
| | Text input web form | o | o | default/kkk_text |
| | Text area web form | o | o | kkk_area |
| | Password input web form | x | o | kkk_password |
| | File input web form | x | o | kkk_file |
| | Combo box web form | x | o | kkk_combo |
| | Checkbox web form | x | o | kkk_checkbox |
| | Radio button web form | x | o | kkk_radio |
| | user defined web form | x | o | kkkuser_Webform name | x: not supported  o: supported

FIG.19

| Web Form Type | | Generated Source |
|---|---|---|
| (text input box) | Text input web form | `<input type="text" name="item1"/>` |
| (text area box) | Text area web form | `<textarea rows=10 cols=50 name="item1"> </textarea>` |
| **** | Password input web form | `<input type="password" name="item1"/>` |
| Search | File input web form | `<input type="file" name="item1"/>` |
| 12 AM ▼ | Combo box web form | `<select name="item1"> <option value="item1" selected>item1</option> <option value="item2"> item2</option> </select>` |
| ☐ item1 | Checkbox web form | `<input type="checkbox" name="item1" value="item1" checked/>item1` |
| ⦿ item1 ○ item2 | Radio button web form | `<input type="radio" name="item1" value="item1" checked/>item1 <input type="radio" name="item1" value="item2" />item2` |
| u s e r d e f i n e d | Return Value comp.call button | user defined Web form | `<input name="item1" readonly ><a href="javascript:userdefinedname ('item1', 'item2');"><img src='userdefinedname.gif' border='0'></a>` |
| | ex.) 2004-04-14 🗓 | Calendar web form | `<input name="item1" readonly value="2004-04-19"><a href="javascript:calendar('item1');"><img src='calendar.gif' border='0'></a>` |
| | ex.) Search Postcode | Postcode web form | `<input name="item1" readonly ><a href="javascript:postcode('item1', 'item2');"><img src='postcode.gif' border='0'></a>` |

METHOD OF CREATING AN XML DOCUMENT ON A WEB BROWSER

TECHNICAL FIELD

This application is a 371 national phase filing of PCT/KR04/001418, filed Jun. 15, 2004, which claims priority to Korean Patent No. 10-2004-0034358, filed May 14, 2004.

The present invention generally relates to a method of creating an XML document on a web browser, and more particularly to a method with which users can easily create XML documents in a predefined formal form such as resumes, commercial agreement sheets, official documents, etc., using web browsers.

BACKGROUND ART

Recently, with the advent of the Internet that uses TCP/IPs (Transmission Control Protocol/Internet Protocols), numerous server computers and client computers are connected together as a single network. Through the Internet, users can create or generate, transmit and receive lots of information, by means of a personal computer in his/her home or office, or a portable computer.

Users can access to web sites operated by WWW (World Wide Web; web) server computers, using a web browser, such as, Netscape®, Navigator® or Microsoft® Internet Explorer, and can be provided various services, e.g., information search, community activities, transactions, etc. provided through the aforementioned web sites. In this case, data are typically transmitted from a server computer to a web browser of a client's computer, using HTTPs (Hypertext Transfer Protocols). The data transmitted to the web browser are referred to as web pages, and which typically is HTML (Hypertext Markup Language) documents.

HTML is a markup language that being widely used to create web pages, and has an advantage that ordinary users can easily understand it and make use of it. Furthermore, using an HTML document editor commercially available, an HTML document having complicated and many contents can be easily generated and edited. As such, easy creation and edition of HTML documents by ordinary users without specialized knowledge in programming is believed to be the most important reason for current success of the web. However, one of disadvantages of HTML is that HTML is the presentation language for formats and layout, not the language for describing data. Therefore, it is possible to easily create and format documents by using HTML, but there is a limitation when reusing the HTML documents as those in different type, and it is very difficult for searching useful information within the contents of the HTML documents. In addition, since HTML uses predetermined elements (for example, <HTML>, <BODY>, <TABLE>, etc.), document types that can be presented are also limited.

As a solution for overcoming such limitation of HTML, XML (eXtensible Markup Language) has been proposed. XML was adopted as a standard for data exchange by W3C (World Wide Web Consortium) in 1999, and has been noted as next-generation Internet language because it has various advantages in regard of extensibility, compatibility, structurization of information, etc.

Most of current web pages are however still based actually on HTML, not on XML, although a considerable time has elapsed since XML appeared. It results from many reasons, but, among other things, it is because XML is too complicated for ordinary users to easily learn and use it freely.

Several XML editors have conventionally been proposed to allow ordinary users to use them, such as the editor for converting existing documents into XML documents and the editor for generating XML documents. For example, the conventional word processors for editing and generating an HTML document, an MS Word document, an HWP document, etc., may have an additional function for converting the documents in a format of HTML, MS Word, HWP, etc., into corresponding XML documents. An example of known editors for editing XML documents is disclosed in US Pat. 2003/0237048 by Microsoft Corporation (published on Dec. 25, 2003), in the title of 'Word Processor For Freestyle Editing of Well-Formed XML Documents'. Also, FIG. 1 schematically shows conventional processes 10 of creating XML documents. As shown in FIG. 1, for example, an XML editor 11 that uses components executable on a web browser such as XML Spy®, commercially available from Altova, located in Vienna, Austria. Also has been known. And, an XML editor 12 executed as an independent executable program such as InfoPath® commercially available from Microsoft Corporation has been known.

According to such conventional editors for creating the XML documents, an XML document 19 is finally created with the data input by a user. However, using such conventional editors, the data input by the user cannot be used to create an XML document without conversion. The data input by the user through the editor 11 or 12 are converted via a dedicated format (e.g., ".XSN") 13 or via Schema_(".XSD") 15, or stored in a database (DB) 17. The data can then be used to create a desired XML document 19 in the end a separate conversion program, that is XSLT(eXtensible Stylesheet Language Transformations) 18.

Thus, the conventional editors for creating XML documents require programming or hard coding as an intermediate stage or conversion of the data input by a user to create the XML documents. Programming or hard coding for the respective intermediate process results in much development time and cost. In addition, by matching one XML document to one XSL document, a final XML document is created through programming, hard coding, conversion, etc. Accordingly, with the prior art editors, programming and hard coding is required, respectively, for each document in order to create documents in various formats for off-line use, so that it is very hard and difficult work for an ordinary user who does not have knowledge in programming to create an XML document.

Therefore, there has been a need for an editor for creating XML documents in various formats as in off-line use forms in a manner to minimize additional development cost or maintenance cost, and with which a user without knowledge of programming language, etc., could easily generate XML documents.

DISCLOSURE

It is a general object of the present invention to provide a novel method having additional advantages for creating an XML document, in order to solve aforementioned problems in the prior art method for creating XML documents.

It is a specific object of the invention to provide a method of creating an XML document according to the so-called 3A (Anywhere, Anytime, Any user) concept, the method allowing even an ordinary user without knowledge in programming to easily create XML documents on a web browser environment using HTTP protocols of the Internet.

It is still another specific object of the invention to provide a method of creating an XML document according to the XML standard specification adopted by W3C, using web forms executed on a web browser, the method achieving minimized additional development cost and/or maintenance cost.

It is still another specific object of the invention to provide a method of creating an XML document in a formal form, e.g., resumes, commercial agreement forms, official documents, etc., by configuring the XML document creation method to comprise a first process of initially creating an XML document as a source file only once for a desired document to be created in a certain form, and a second process for inserting data input by a user via a web browser into the structure of the one source file created as in the first process to create numerous XML documents automatically as a duplicated document having same structures.

It is still another specific object of the invention to provide a method of automatically creating an XML document without conversion to a different format, a storage process in a database or a conversion process by means of XSLT for the input data, as soon as a user enters data into a web form on a web browser and submits the data, without additional programming or hard coding under the concept of 3A (Anytime, Anywhere, Any user).

In order to achieve the aforementioned objects, according to an aspect of the invention a method of creating an XML document on a web browser is provided. The method comprises the steps of: receiving data input from the web browser; duplicating a source XML (eXtensible Stylesheet Language) document stored in advance, the source XML document having a predefined structure and including predetermined source data according to the structure; replacing the source data included in the duplicated XML document by the received input data; and storing the XML document resulted in the replacing step as a new XML document.

Here, the source XML document stored in advance has been converted from a Hypertext markup language (HTML) document and then stored. In addition, the data received in the step of receiving the data from the web browser may be transmitted by means of a web page with at least a form input structure that allows the data to be input. Furthermore, the step of replacing the source data included in the duplicated XML document by the received input data is carried out by means of a DOM (Document Object Model) file, which can access to the structures of the source XML document and can set up data values, wherein the DOM file has been preferably created in advance from the source XML document and stored.

In another aspect of the invention, a method of creating sources is provided for automatically creating a new document in a first hierarchical structure, using data transmitted by means of a document in a second hierarchical structure. The method comprises the steps of: automatically creating a document in a first preliminary hierarchical structure from an original document in the second hierarchical structure, and a preliminary stylesheet document associated with the document in the first preliminary hierarchical structure; allowing a document in the first hierarchical structure and a stylesheet document associated with the document in the first hierarchical structure to be created, by mutually mapping the document in the first preliminary hierarchical structure and the preliminary stylesheet document; automatically creating a type definition and validity verification means from the document in the first hierarchical structure, the type definition and validity verification means is associated with the document in the first hierarchical structure, can define a data type of the document in the first hierarchical structure, and can verify its validity; automatically creating a data value setup means from the document in the first hierarchical structure, the data value setup means is associated with the document in the first hierarchical structure, and can access to and set up data values of the document in the first hierarchical structure; and automatically creating a document in a second hierarchical structure for inserting from the stylesheet document and the type definition and validity verification document, the document for inserting allows a new document in the first hierarchical structure to be created by sending input date to the data value setup document.

The method can further comprise the step of creating, opening or editing the original document in the second hierarchical structure. Furthermore, the method can further comprise the step of automatically creating a document in the second hierarchical structure for updating from the document for inserting, the document for updating modifies the data in the new document in the first hierarchical structure. In a preferred embodiment of the invention, the document in the first hierarchical structure is an XML document; the stylesheet document is an XSL document; the type definition and validity verification means is a DTD or schema document; and the data value setup means is a DOM embodied as a server side script page. Furthermore, the document in the second hierarchical structure for inserting is preferably an HTML document having at least a form input portion. Also, the method can further comprise the step of uploading the source means for create the new document in the first hierarchical structure to the server.

In another aspect of the invention, a computer readable recording medium on which a program is recorded is provided. The program recorded on the recording medium may comprise instructions for computer programs to automatically create XML documents having given structures on a web browser, by executing each step in the aforementioned method.

DESCRIPTION OF DRAWINGS

These and other features, aspects, and advantages of the present invention will become apparent through the following description, with reference to the appended drawings. In the drawings:

FIGS. 5 to 22 show flow charts for describing, in more detail, respective steps of the process in a tool for creating source means in a method of automatically creating an XML document according to one embodiment of the invention;

BEST MODE

Hereinafter, preferred embodiments of the present invention will be described in detail with reference to the accompanying drawings.

Figure 1:
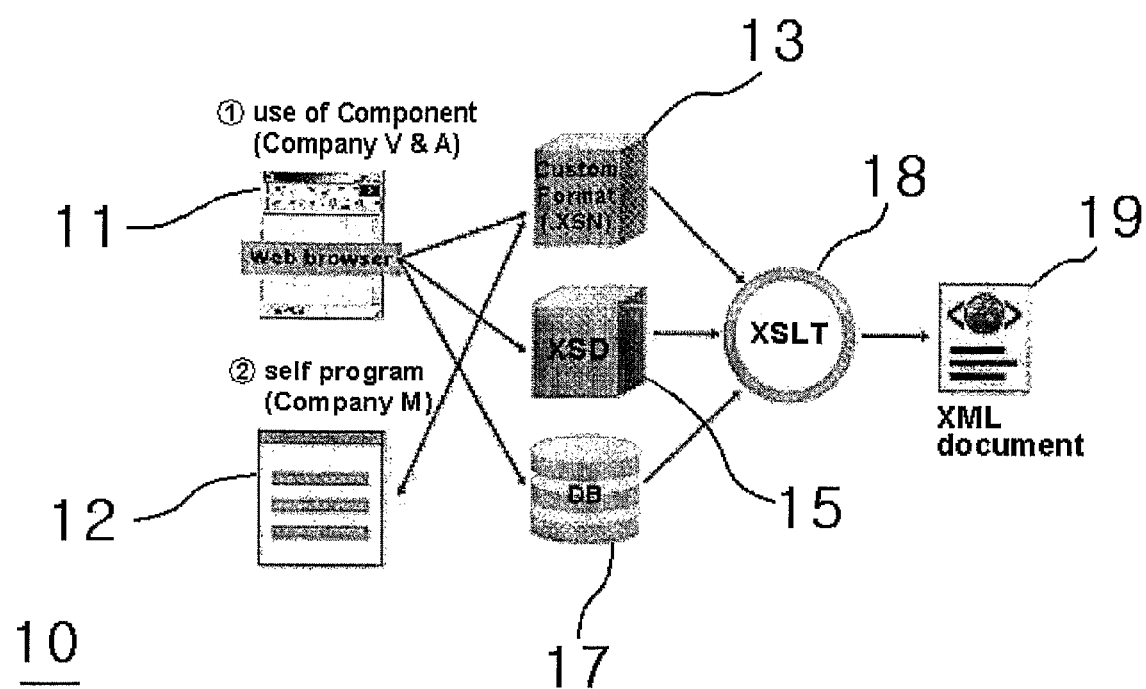
FIG. 1 schematically shows a prior art process of creating an XML document.
Figure 2:
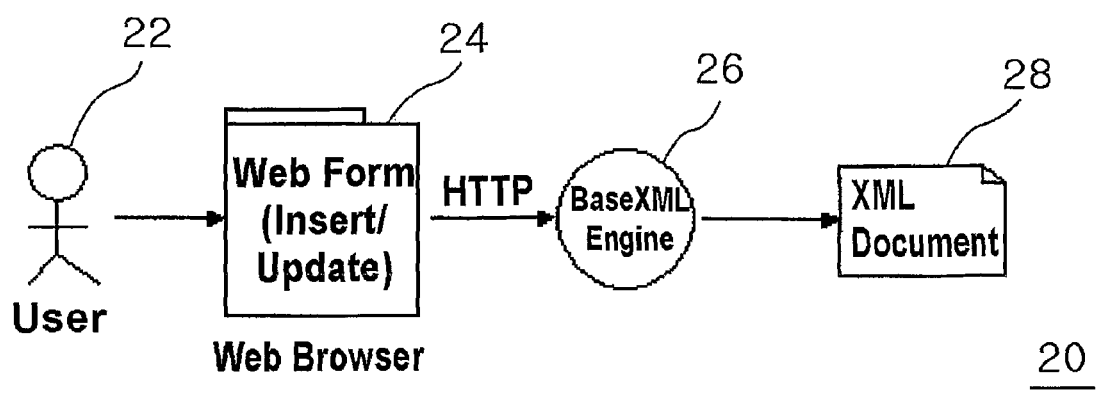
FIG. 2 schematically shows a process of creating an XML document according to one embodiment of the invention.

FIG. 2 schematically and conceptually shows a process 20 of creating XML documents according to the invention. According to the invention, a user 22 may enter and submit data, using a web form 24 in a web page displayed on a web browser which is executed, for example, on his computer connected to the Internet. The input data may be transmitted to a server computer via the HTTP protocol over the web. The transmitted input data may be delivered to a base XML engine 26 that is a program being executed on the server computer. The engine 26 may then automatically create an XML document 28 including the input data.

According to a preferred embodiment of the invention, the engine 26 with which the user automatically creates the XML document 28 including the input data is implemented as a software program to be executed on a web server computer that can be connected to the user's computer, that is a client, through the Internet. However, the engine 26 according to the invention is not necessarily limited only to this application. For example, the engine 26 may be embodied as a local software program to be executed on the user's computer, or alternatively as a local software program to be executed on a different computer connected to the user's computer by means of LAN. Furthermore, a portion or all portions of the engine 26 may be embodied as hardware.

In the present invention, the engine 26 for automatical y creating XML documents is featured by a technique of generating new documents by duplicating source files stored in advance, as described in detail below. The source files stored in advance may be created by means of a tool for automatically creating the source files, which tool is also provided according to the invention. The source files can include an XML document having given structures and data, an XSL file that is a style for displaying the XML document on a web browser, a DTD or schema file for checking data type definition and validity of the XML document, and a DOM file for accessing to the structures of the XML document and setting data values. Thus, the method of creating an XML document according to the invention is featured by two processes of creating sources and creating the XML documents based on the sources.

Figure 3:
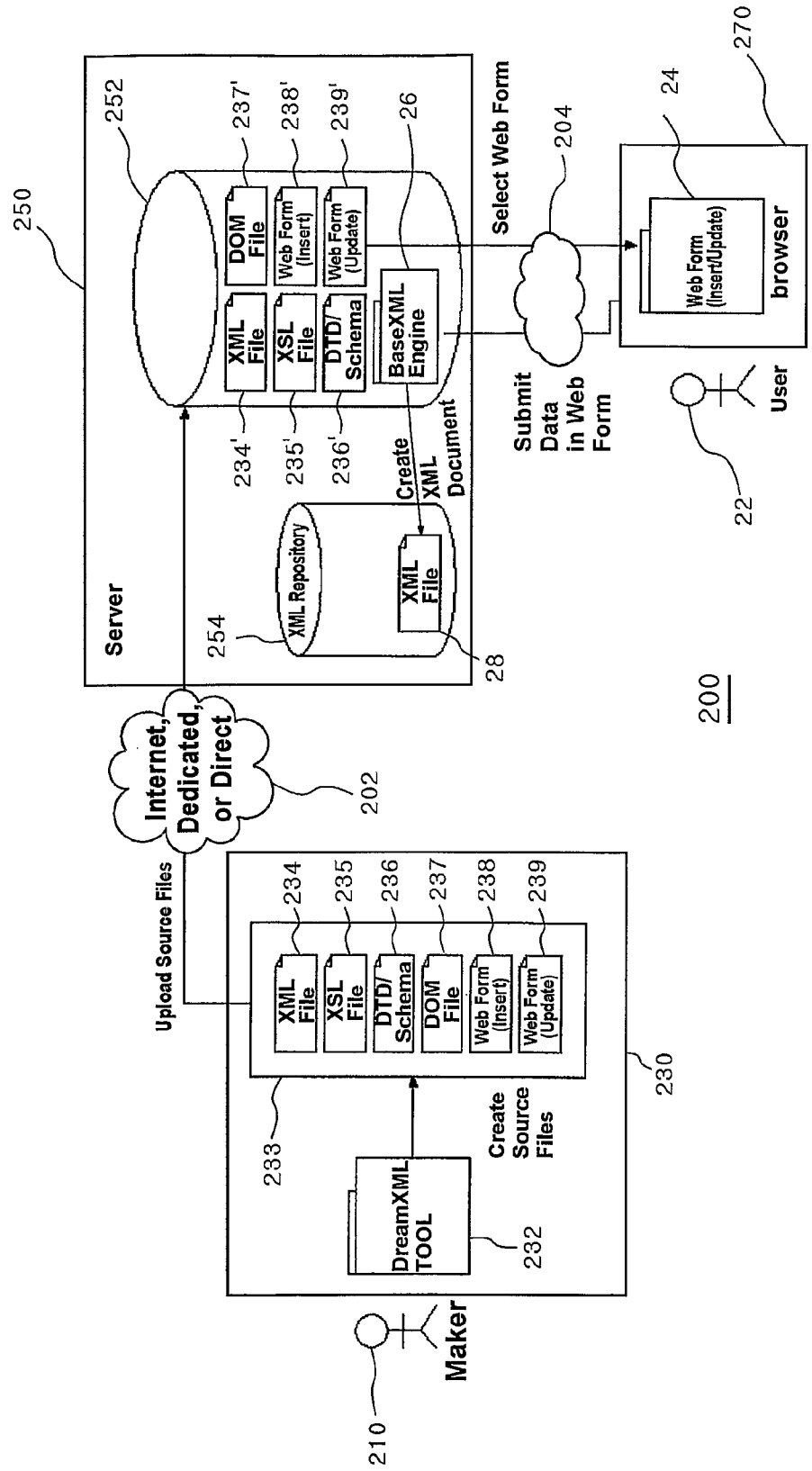
FIGS. 3 and 4 show conceptual blocks for describing the process in FIG. 2 in more detail.

An overall operation process of the tool for automatically creating source files and the engine for automatically creating XML documents, and the system 200 provided according to a preferred embodiment of the invention are shown in FIG. 3 as a schematic block diagram. The system 200 according to a preferred embodiment of the invention comprises a user's computer system 270 to allow a user 22 to enter data, a server computer system 250 that can be connected to the system 270 via, for example, the Internet 204, and a computer 230 of a source maker 210, which computer 230 can be connected to the server system 250 via a network 202, such as the Internet, a dedicated network, or a direct connection. Respective computers 230, 250 and 270 as hardware, in which the tool 232, the engine 26 and source files that is created, stored and executed according to the invention, may be understood to be a computer system that can be connected as a network, such as, for example, a main frame, desktop computer, laptop computer, palmtop computer, etc. Since the specific hardware configuration of such a system is well known in the field, detailed description thereof will be omitted herein.

For a method of creating an XML document according to the invention, source files 233 is first created by means of a source creation tool 232. Preferably, the source maker 210 is a person who has some knowledge in programming, but it will be dearly understood below that an ordinary user without knowledge in programming may act as the source maker 210 after taking some practice.

Using the tool 232 provided according to the invention (in particular, for example, 'DreamXML TOOL®' available from 3Ksoft, located in Seoul, Korea), the source file 233 can be created through the process described in detail hereinafter. The source files 233 include an XML file 234, an XSL file 235, a DTD/Schema file 236, a DOM file 237, etc. as described hereinabove. Such source files 234, 235, 236 and 237 will be used in the process of creating an XML document by means of the engine 26, and exist inaccessible to the ordinary user 22, that is, transparently. The tool 232 may also create a web page having a web form structure (hereinafter, may be simply referred to as a 'web form'). The web form that can be created includes web form 238 for inserting with which the user 22 could create a new XML document and an web form 239 for updating with which the user 22 could modify the data in the XML document already created.

The tool 232 may be provided further with a function to upload the created source files 233 to the server 250 via, for example, the Internet, LAN or the dedicated network 202. The uploaded source files will be stored as one set 234', 235', 236, 237' 238' and 239' in a form repository 252. After the source files has been created and stored in a preliminary process for creating XML documents, the user 22 may access to the server 250 via the web browser 270 for generating a desired XML document.

The server 250 may provide the user 22 with links to the web forms 238' for entering data in order to create various XML documents. For example, the server 250 can provide a web page including links, each of which is connected to each of a plurality of web forms 238' for entering data, respectively. The web forms 238' may be various in its form, for example, a web form for preparing a resume for application for employment, a web form for preparing an order sheet to buy goods from a company, a web form for preparing a notification of a transferred address due to movement in a community office, etc. The user 22 may click a link for a web form corresponding to a desired document to display the web form on his/her browser 24.

The user 22 may enter data via the web form 238' as required in the web form 238'. The data that can be entered by the user may be any type of data that can be entered by means of a web faun structure, for example, text data such as name, numeral data for indicating date of birth, image data such as a photograph, etc. The user 22 who has entered all the required data submits the web faun file 238' to the server 250. The engine 26 (in particular, e.g., 'BaseXML Engine®' available from 3Ksoft, located in Seoul, Korea) for automatically creating an XML document, is operating in the server 250, receives the input data submitted. The engine 26 can replace source data by the input data in the XML file 234' by means of the DOM file 237'. The replaced file is created as a new XML file 28 and the created file can be stored in the XML repository 254 for later use.

In the method of creating an XML document according to the invention, the user can directly create an XML file, using a web form and by means of an XML file and a DOM file, etc. stored in advance, without a conversion process through a different format, such as DB and XSLT. To this end, in the present invention, the data entered by the user 22 are entered as data conforming to the structures of the source XML file, which conformity can be ensured by the web form structure. Also, in the present invention, the user 22 can create a sort of duplicated XML document that has the same structure as the source XML file but has different data. This can be ensured by the DOM file that is used for replacing the source data by the data values complying with the data structures of the source XML file.

Figure 4:
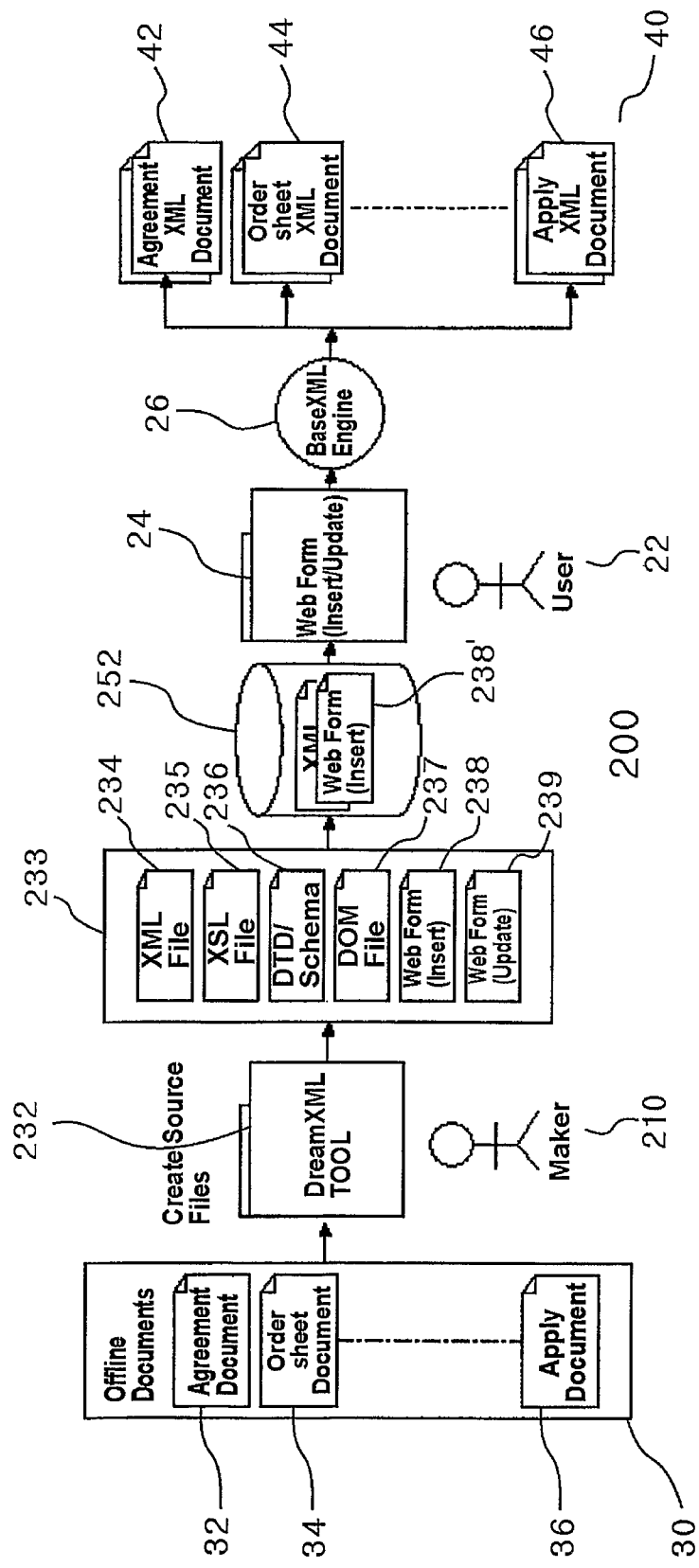

As described above, the method of creating an XML document according to the invention is to create a duplicated XML document which has the same structure as the source XML document but has different contents, and can thus be referred to as a method of duplicating an XML document. FIG. 4 shows a process and a system 200 for showing such a concept of duplicating and creating an XML document according to the invention. As shown in FIG. 4, the source maker 210 may create and store a set of source files 233 in the form repository 252 of the server, using a tool 232. The source files 233 allows the source maker 210 to create, for example, an agreement sheet 32 that is one of off-line documents 30, as an XML document. The source maker 210 may make and upload to the server a set of source files for preparing an order sheet 34 in a similar manner. The source maker 210 may also make and upload to the server a set of source files for preparing an application for employment 36 in a similar manner. Thus, according to the invention, it is sufficient for respective documents in each desired form that the source maker 210 creates a set of source files only once.

The user 22 may display the web form 238' for creating an XML document of an agreement sheet 32 on the web browser 24. The user 22 may then enter data required in the web form 238' and submit the document to the server. The engine 26 for automatically creating an XML document in the server replaces the data in the XML file 234 of the source agreement sheet by the input data submitted then to create a duplicated agreement sheet of a new XML file 42. In the same manner, other users may automatically create XML files of their own agreement sheets 42 by entering their own data. In order to create a desired-type XML document, the only thing required from the user 22 is to enter and submit the data required in the web form structure on the web browser to create any document, as long as corresponding web form 238' was uploaded onto and exists in the form repository 252 (XML documents 40, such as, the XML document of the order sheet 44, the XML document of the application form for employment 46, in the example shown in FIG. 4).

According to the invention as described above, the user 22 may generate an XML document easily and simply even without any knowledge in programming anywhere and at any time, on a precondition that there is a web form for creating the XML document already made by any source maker.

Hereinafter, the process executed by the tool 232 for automatically creating source files and the engine 26 for automatically creating XML documents as described in the above will be described in more detail with reference to the drawings.

Figure 5:
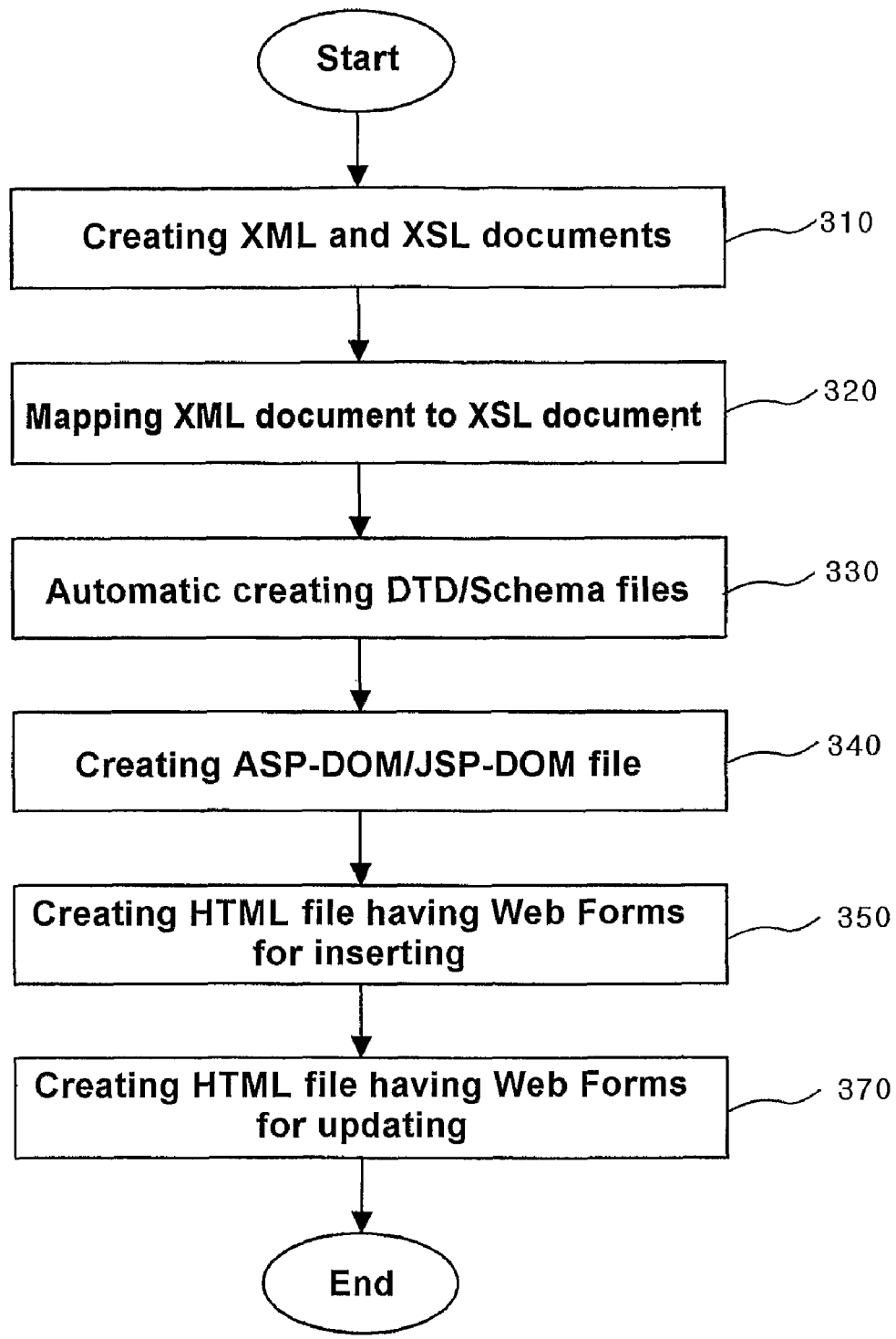

FIG. 5 schematically shows the steps by the tool 232 for automatically creating source files. As shown in FIG. 5, the process 300 of creating source files that can be done by the tool 232 for automatically creating the source files comprises the step 310 of creating a preliminary XML document and a preliminary XSL document on the basis of a HTML file as the original document for creating the XML document. The created preliminary XML document is mapped with the created preliminary XSL document by the source maker thereby resulted in final source XML and source XSL files, in step 320. Depending on source maker's choice, a DTD file and/or a schema file can be created in step 330 on the basis of the source XML and source XSL files. In addition, the DOM file based on the source XML file can be automatically created in step 340. In this case, the DOM file can be created as an ASP-DOM or JSP-DOM file that is a server side script page. A web form file for inserting, that is, an HTML file can then be automatical y created on the basis of the source XSL file, in step 350. A web form file for updating, that is, an HTML file can be automatically created on the basis of the web form file for inserting, in step 370.

Figure 6:
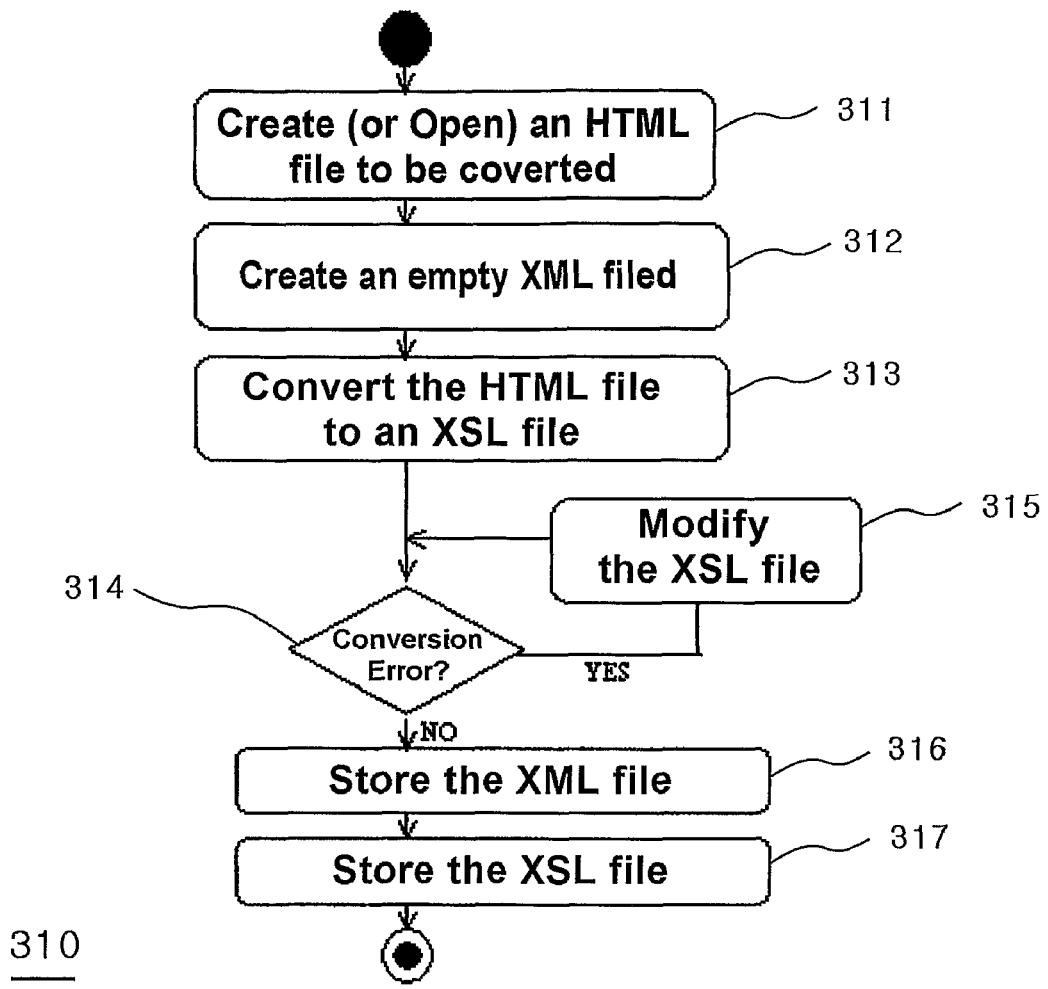
Figure 7:
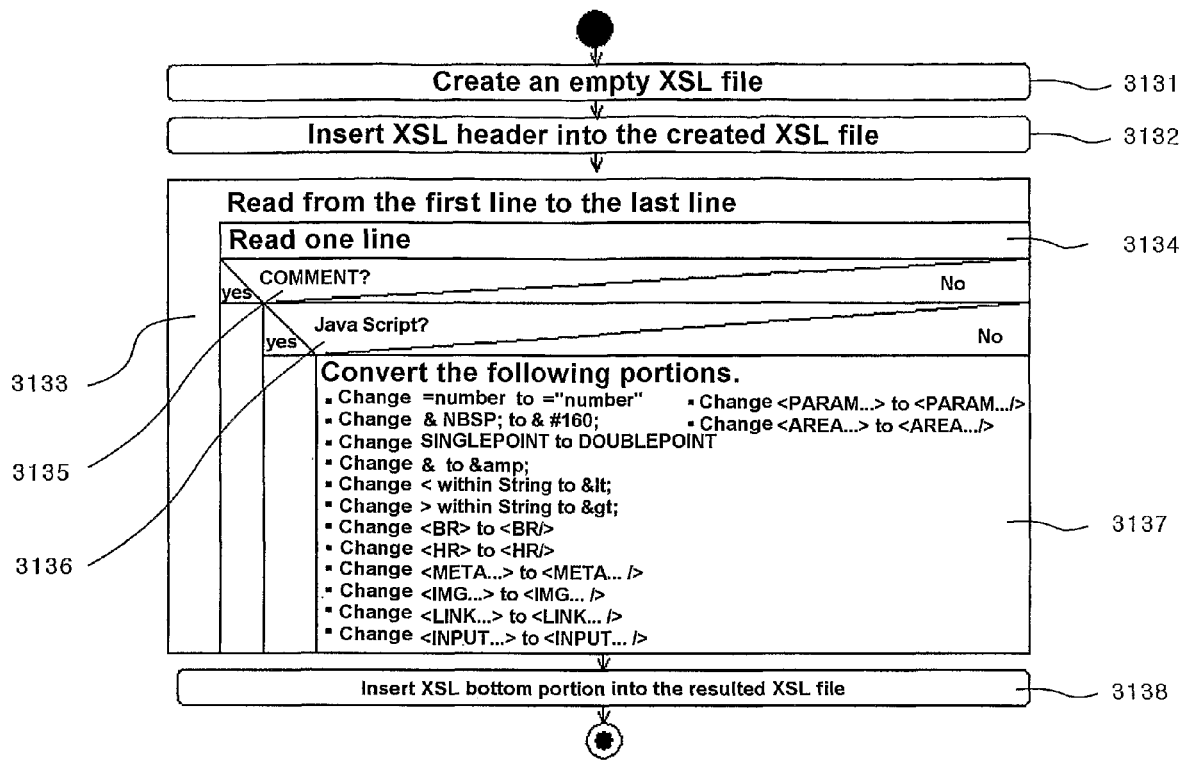
Figure 8:
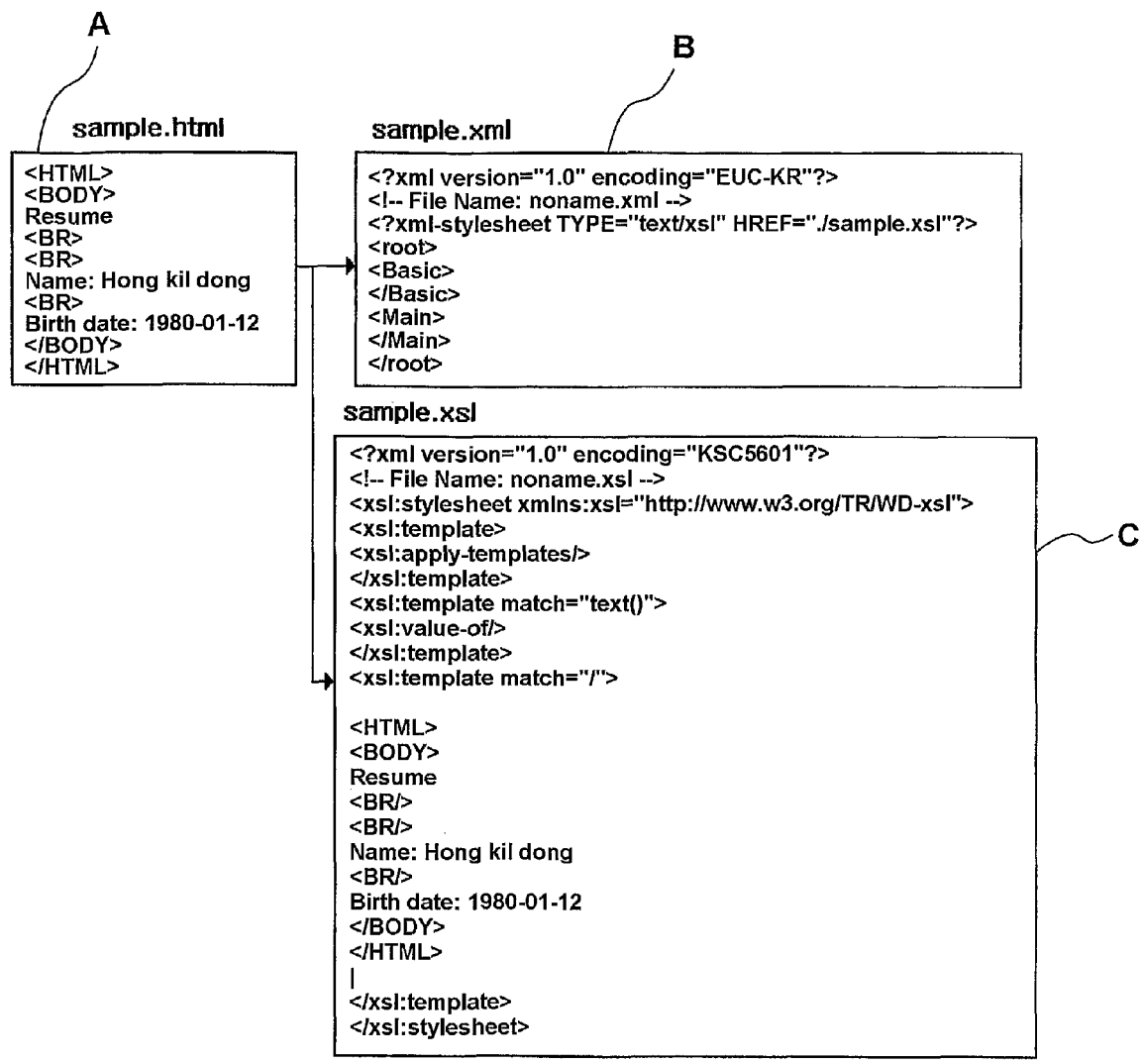

In FIGS. 6 to 8, the step 310 of creating the preliminary XML file and the preliminary XSL file from the original HTML file is described in more detail with flow charts and illustrative program codes. In the step 310 shown, the original HTML file to be converted is first created or opened in step 311. The original HTML file may be created newly by means of the tool for automatical y creating source files provided according to the invention, or may be a file already created by means of different software. Also, the source HTML file may be a resulted file converted by any word processor from a document file having a unique format of the word processor itself to an HTML format. Furthermore, the original HTML file may be a different HTML file originating from any other source. In the example shown in FIG. 8, 'sample.html'(A) is illustrated as an example of the original HTML file. On the basis of the file A, a preliminary XML file B and a preliminary XSL file C may be created. At first, the preliminary XML file is created as an empty XML file in step 312. Herein, the 'empty' XML file means a XML file basically having predetermined structures but not having specific data, as shown in FIG. 8 as an illustrative code sample.xml. The preliminary XSL file is generated from the original HTML file in step 313. Errors occurring during the conversion process are then checked in step 314, so that the source maker can correct the errors in step 315. The resulting preliminary XML file and the preliminary XSL file may be stored for subsequent processing thereafter in steps 316 and 317.

The step 313 of converting the original HTML file to the preliminary XSL file is illustrated in FIG. 7 in more detail. First, an empty XSL file is created in step 3131. A predetermined XSL header is then inserted into the created empty XSL file in step 3132. Specific coding of the XSL header is illustrated in C for sample.xsl in FIG. 8. It should be noted that the invention is not limited only to the illustrated examples and various modifications and variations that can be contrived by those skilled in the art are also covered within the scope of the invention. From the first line to the last line, the contents in the source HTML file are read and converted in step 3133. Describing the step 3133 in more detail, one line is first read in step 3134. In step 3135, it is checked whether the read line is a comment portion, that is, a note only for description, not actually useful portion of a coding. If it is yes, the process proceeds with reading the next line. If it is no, it is checked again whether the corresponding line is a Java script in step 3136. If it is then yes, the process proceeds with reading the next line. If it is no, the line is converted as shown in the step 3137 and the result is then added to the created XSL file. The shown conversion process is only for illustration, and those skilled in the art will easily understand that an additional conversion or alternative conversion process can be applied, if appropriate. When conversion of one line finishes as described above, the same process repeats to the last line. When conversion of the source HTML file is completed, the predetermined XSL bottom portion is added to the resulted XSL file generated as a result in step 3138, as shown in one example of sample.xsl in FIG. 8.

Figure 9:
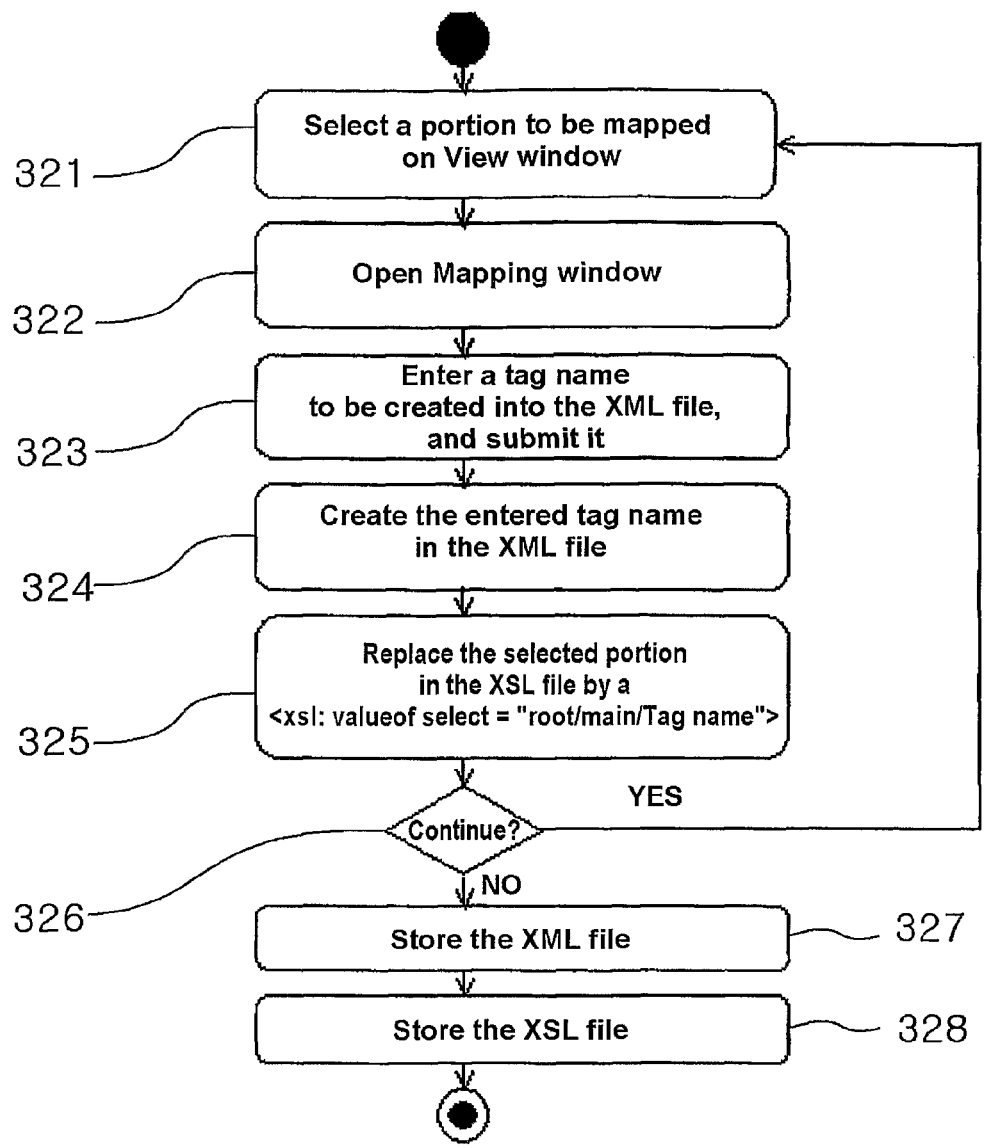
Figure 10:
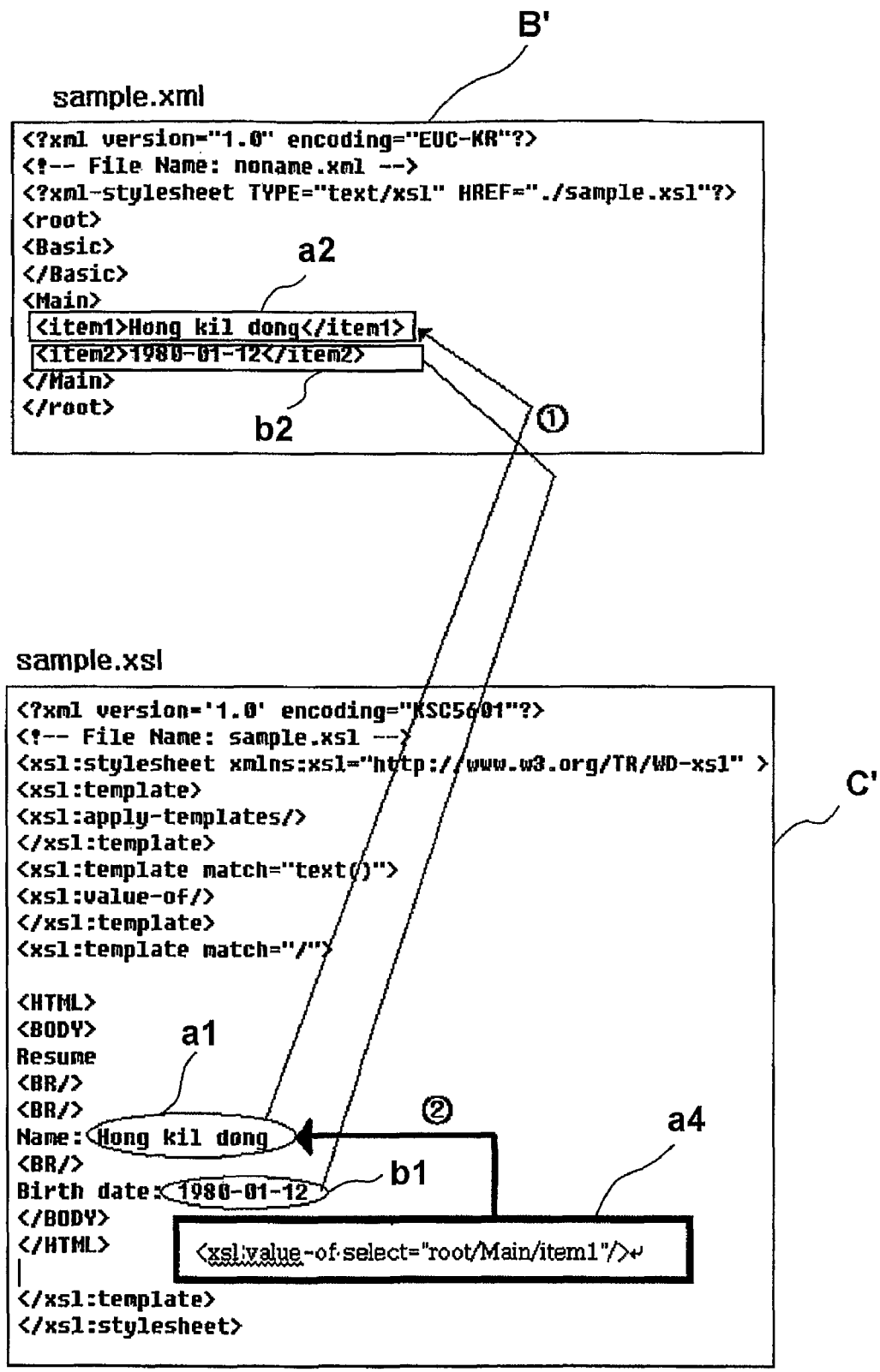

As shown in FIGS. 9 and 10 in more detail, the source maker maps mutually the created preliminary XML file with the preliminary XSL file, so that a final source XML file and a final source XSL file can be created in step 320. In step 321, the source maker first selects a portion to be mapped from the codes in the preliminary XSL file on the displayed window. Herein, the portion to be mapped corresponds to the contents in a new document to be made that will become different from the contents of the corresponding document. For example, the portions indicated as a1 and b1 in the contents of sample.xsl (C') in FIG. 10 are those to be mapped. The portions a1 and b1 are mapped to the corresponding portions a2 and b2 of sample.xml(B'), respectively, and the portions a1 and b1 are replaced by the predetermined contents such as a4. According to mapping process represented in FIG. 9, the source maker enters a mapping command to open the mapping window in step 322. The user enters and then submits a tag name to be created in an XML file, for example, root/Main/item1 by mapping a selected mapped portion, for example, portional, in step 323. In the XML file B', item 1 is then newly made in the "Main" element of the "root" element and the portion a2 is inserted. At the same time, the corresponding portion in the XSL file, that is, the portional is replaced by <xsl:value-of select="root/Main/item1">in step 325. Thus, one mapping process is completed. It is checked whether there is another portion to be mapped, in step 326. If it is yes, mapping can be carried out in a similar manner for the next selected portion, for example, the portion b1. When mapping is completed, the created XML and XSL files can be stored as source files for later processes, in steps 327 and 328.

Through the steps described hereinabove, for example, for sample.html having the following code shown below in the Source Code 1 that is an original HTML file, a source XML file of sample.xml having the following code shown in Source Code 2 can be created. And a source XSL file of sample.xsl having the following code shown in Source Code 3 can also be created.

```
<Source Code 1>
<HTML>
<BODY>
Resume
<BR>
<BR>
Name: Hong kil dong
<BR>
Birth date: 1980-01-12
</BODY>
</HTML>
    <Source Code 2>
<?xml version="1.0" encoding="EUC-KR"?>
<!-- File Name: noname.xml -->
<?xml-stylesheet TYPE="text/xsl" HREF="./sample.xsl"?>
<root>
<Basic>
</Basic>
<Main>
    <item1>Hong kil dong</item1>
    <item2>1980-01-12</item2>
</Main>
</root>
    <Source Code 3>
<?xml version="1.0" encoding="KSC5601"?>
<!-- File Name: noname.xml -->
<xsl:stylesheet xmlns:xsl="http://www.w3.org/TR/WD-xsl">
<xsl:template>
<xsl:apply-templates/>
</xsl:template>
<xsl:template match="text( )">
<xsl:value-of/>
</xsl:template>
<xsl:template match="/">
<HTML>
<BODY>
Resume
<BR>
Name: <xsl:value-of.select="root/Main/item1>
```

-continued

```
<BR>
Birth date: <xsl:value-of.select="root/Main/item2>
</BODY>
</HTML>
</xsl:template>
</xsl:stylesheet>
```

Figure 11:
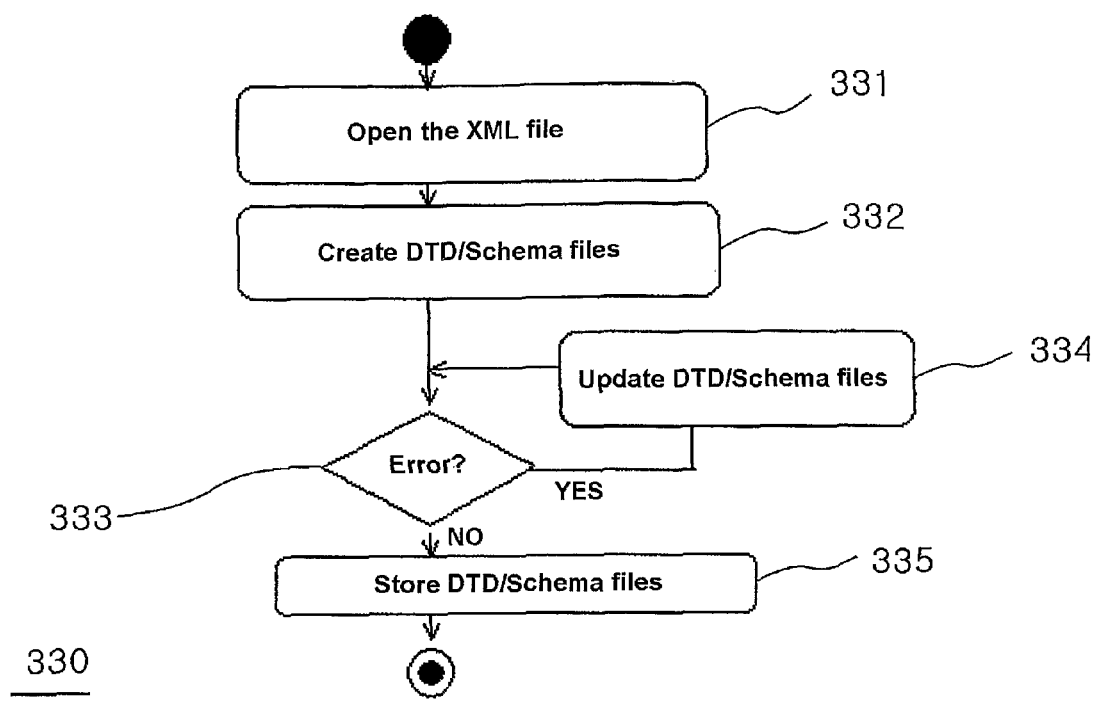
Figure 12:
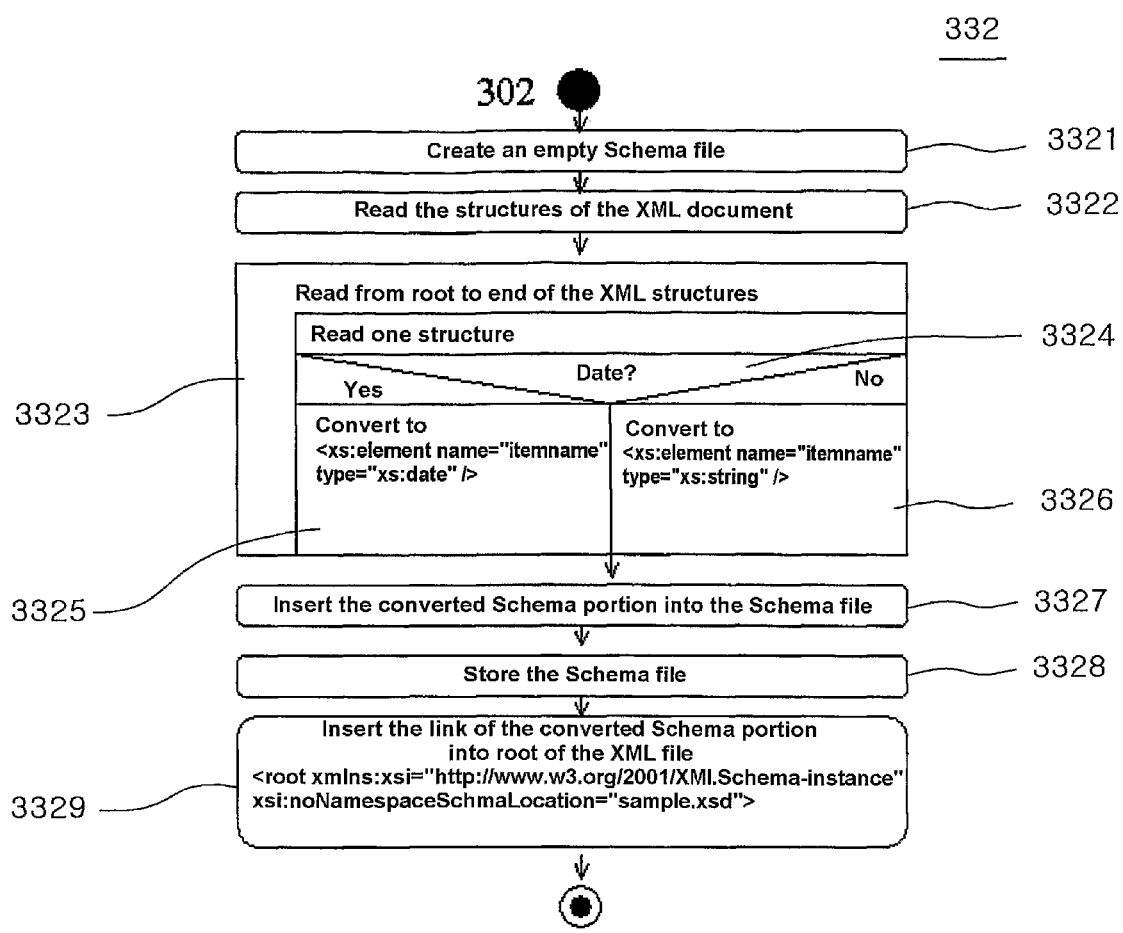

FIGS. 11 and 12 show the steps 330 and 332 of automatically creating a DTD (Document Type Definition) file and/or a schema file from the created source XML file. In step 331, the source maker opens the source XML file. By entering a command for automatically creating the DTD file and/or the schema file or clicking a corresponding icon, the source maker can create the DTD file and/or the schema file corresponding to the opened source XML file in step 332. In step 333, it is then checked whether there is an error in the created files. If errors are found, the source maker can directly correct them in step 334, and the corrected and completed files can be stored as a part of the source files for later use in step 335.

When the source maker opens the source XML file and then enters a command to indicate a schema file to be created, the steps of automatically creating the schema file shown in FIG. 12 can be sequentially executed by the tool for automatically creating source files. The DTD and schema files are not necessarily included in the source files for automatically creating XML documents according to the invention, and may thus be omitted if not required. Now, the step 332 will be described in more detail with reference to FIG. 12. First, an empty schema file is created in step 3321. The tool for automatically creating source files then reads the structures of the opened source XML document in step 3322. In this case, the structures of the XML document is read from the root to the last structure on a one by one structure basis in step 3323. Herein, one structure means one element. When one structure is read, it is checked whether the corresponding structure is a date in step 3324. If it is yes, the structure is converted to a code for indicating the form of date data in step 3325, and, otherwise, converted to a code for indicating the form of string data in step 3326. The converted schema portion is inserted into the empty schema file already created in step 3327 and the final schema file created as a result of insertion is stored in step 3328. A link code indicating the schema portion created as such is then inserted into the root of the source XML file in step 3329.

For a specific example of the source DTD file and the source schema file, created as described hereinabove, the schema file is automatically created to have the following contents shown in Source Code 4 for the above sample.xml.

```
<Source Code 4>
<?xml version="1.0" encoding="EUC-KR"?>
<!-- W3C Schema generated by dreamXML (http://www.3ksoft.co.kr) -->
<xs:schema xmlns:xs="http://www.w3.org/2001/XMLSchema"
  elementFormDefault="qualified" >
<xs:include schemaNamespace="http://www.3ksoft.co.kr/
kkk_schema.xsd" />
<xs:element name="root">
<xs:complexType>
    <xs:sequence>
      <xs:element ref="Basic" />
      <xs:element ref="Main" />
    </xs:sequence>
</xs:complexType>
</xs:element>
<xs:element name="Basic" type="xs:string" />
```

-continued

```
<xs:element name="Main">
<xs:complexType>
    <xs:sequence>
        <xs:element ref="item1" />
        <xs:element ref="item2" />
    </xs:sequence>
</xs:complexType>
</xs:element>
<xs:element name="item1" type="xs:string" />
<xs:element name="item2" type="xs:string" />
</xs:schema>
```

The DTD file is automatically created with the following contents shown in Source Code 5, depending on the structure of sample.xml.

```
<Source Code 5>
<?xml version="1.0" encoding="EUC-KR"?>
<!ELEMENT root (Basic,Main)>
<!ELEMENT Basic (#PCDATA)>
<!ELEMENT Main (item1,item2)>
<!ELEMENT item1 (#PCDATA)>
<!ELEMENT item2 (#PCDATA)>
```

Figure 13:
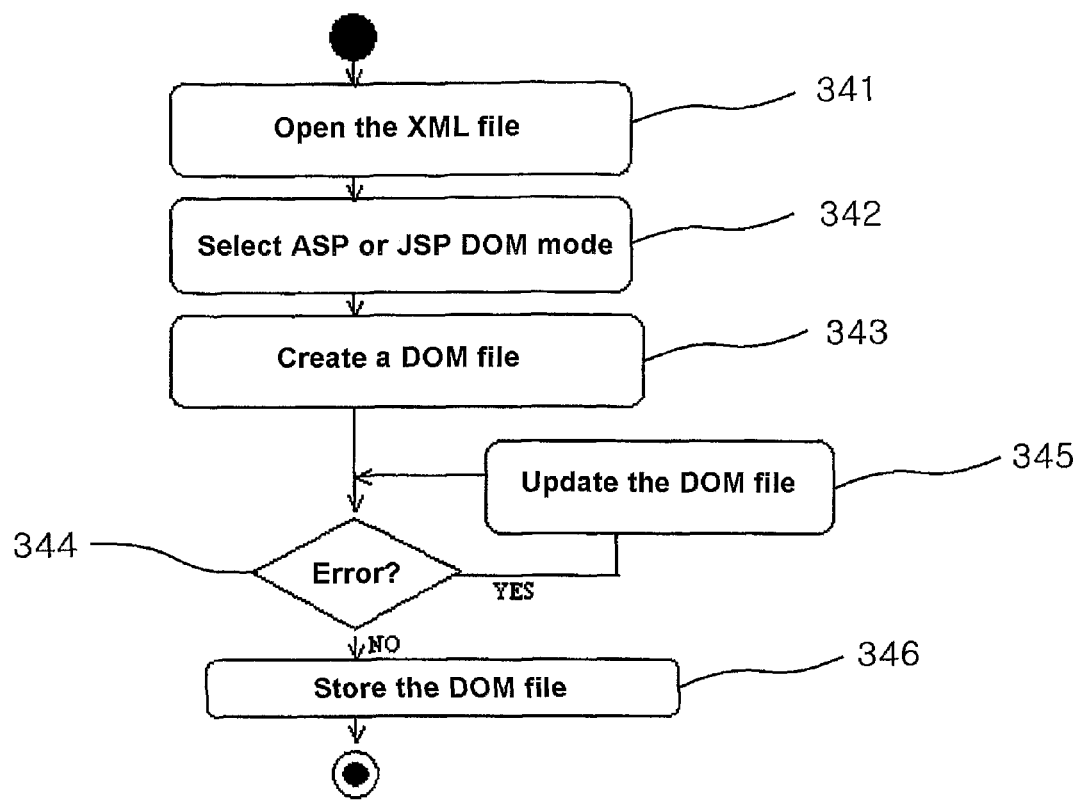
Figure 14:
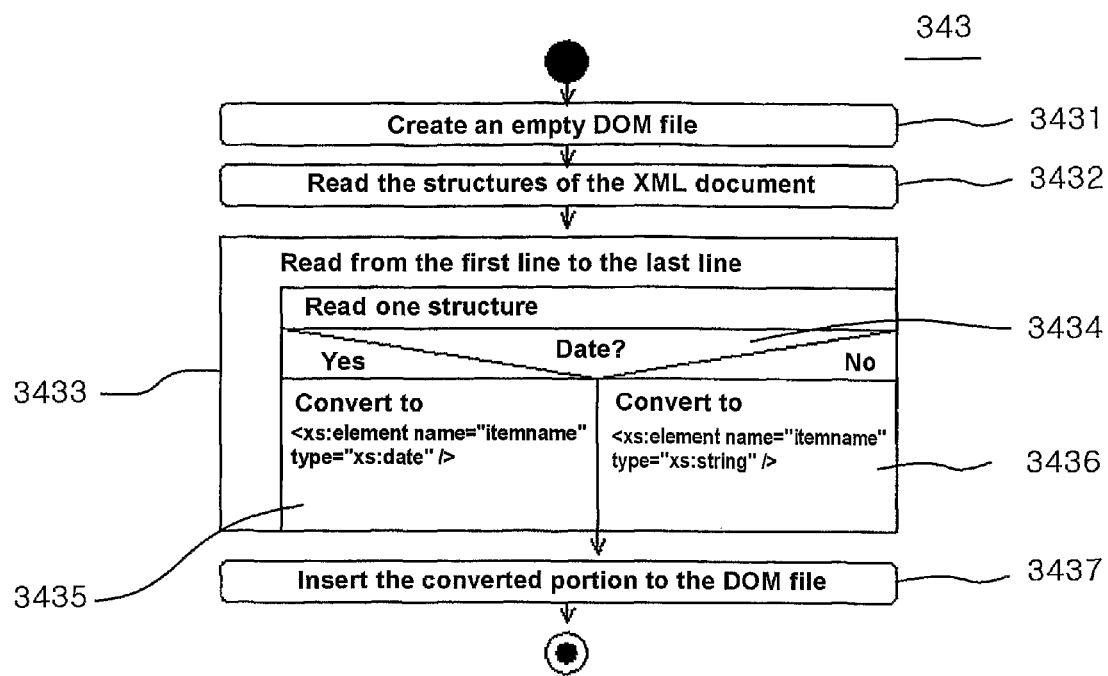

FIGS. 13 and 14 show the step 340 of automatically creating the source DOM (Document Object Model) file in more detail. In the present invention, the DOM file serves to fill the structures of a source XML document with the data input from a user and to automatically create a new XML document having different data in the same structures. For the step 340, the source maker opens a desired source XML file in step 341, and can select a desired DOM mode in step 342. For example, it is possible to select one between the ASP-DOM mode and the JSP-DOM mode, depending on the server environment where a created DOM file is executed. In the present invention, the type of modes is not limited only to ASNActive Server Page) and JSP_(Java Server Page). It should be noted that any environment where the DOM according to the invention can be executed can be used, including all types of server environments already known in the art or to be developed in the future.

After selection of the mode, the source maker then enters a command for creating a DOM file or click an icon with a corresponding function, thereby to automatically create the DOM file in step 343. Then errors are checked in the source DOM file automatically created, in step 344. If an error is found, it is corrected in step 345, and the corrected and completed source DOM file is stored in step 346 for later use. The step 343 of automatically creating a source DOM file from a source XML file by means of a tool for automatically creating source files is illustrated in FIG. 14 in more detail. An empty DOM file is first created in step 3431. The structure of the opened source XML document is read in step 3432. In this case, the structures are read from the first line to the last line in step 3433 on a one by one structure basis. It is checked whether the read structure is a date portion in step 3434. The read structure is classified as date data and non-date data. The date data is converted to a code for indicating a date form in step 3435 and the non-date data is converted to a code for indicating a string form in step 3436. Inserting the codes of the data converted as such into the empty DOM file previously created results in creation of a source DOM file in step 3437. The following example shown in Source Code 6 is sample.asp, which is an example of a source of the ASP-DOM file created from the above sample.xml.

```
<Source Code 6>
<%@Language="JavaScript" %>
<%
var reqValue=new Array("","","");
xmlfile=Request.QueryString("xmlFile")
var objDoc=new ActiveXObject("Microsoft.XMLDOM");
objDoc.async=false;
objDoc.load(Server.MapPath(xmlFile));
for(i=1;i<3;i++){
    reqValue[i]=Request.Form(i).Item( ).split(new RegExp("Wr|Wn","ig"))
}
var objRoot=objDoc.documentElement;
var objchild=objRoot.childNodes.item(0);
objchild=objRoot.childNodes.item(1);
for(i=1;i<3;i++){
objchild.childNodes.item(i-1).text="";
for(num in reqValue[i])
    {
        var objText=objDoc.createTextNode(reqValue[i][num]);
        objchild.childNodes.item(i-1).appendChild(objText);
        var objElem=objDoc.createElement("br");
        objchild.childNodes.item(i-1).appendChild(objElem);
    }
}
objDoc.save(Server.MapPath(xmlFile));
Response.Redirect(xmlFile);
%>
```

Figure 15:
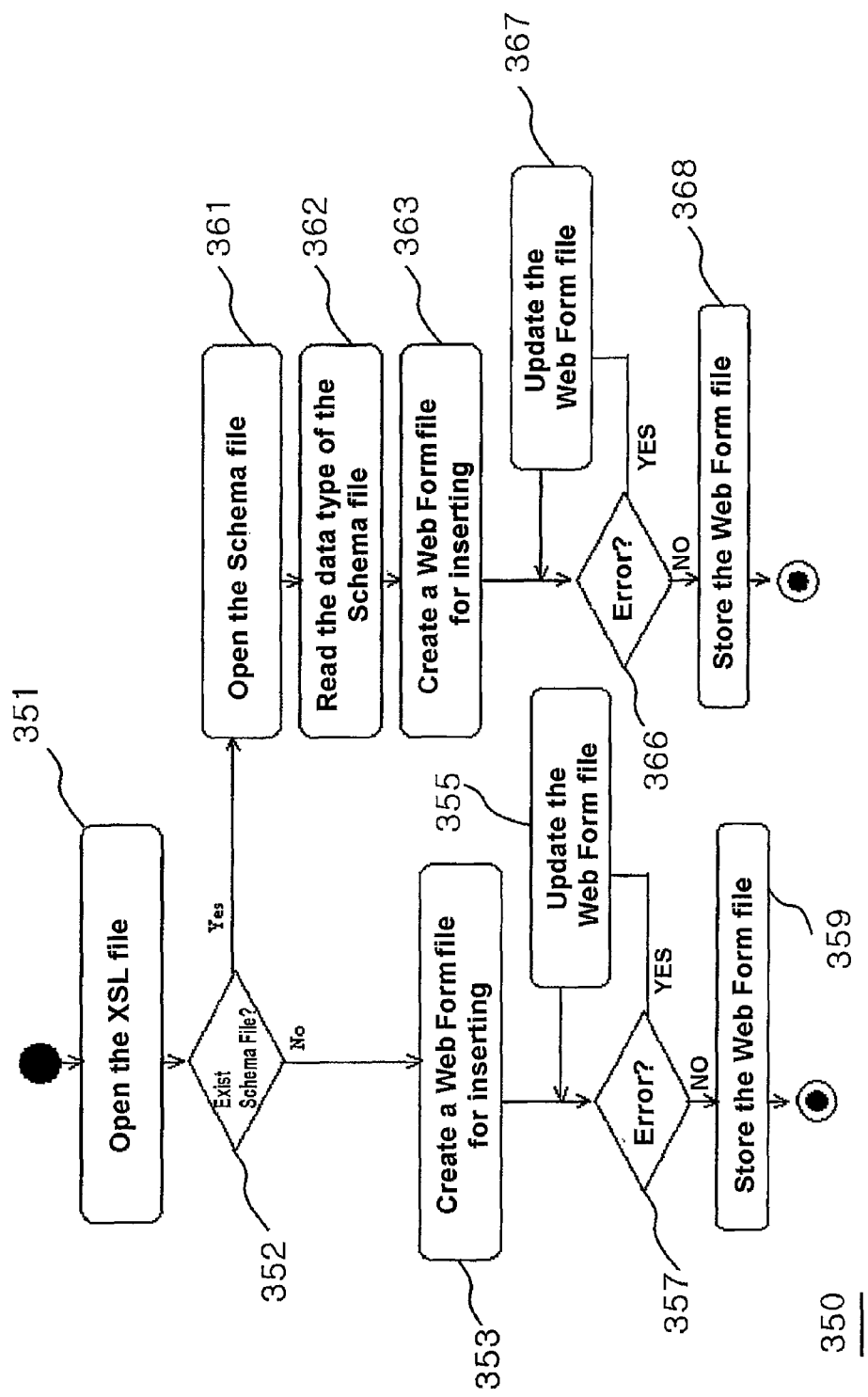
Figure 16:
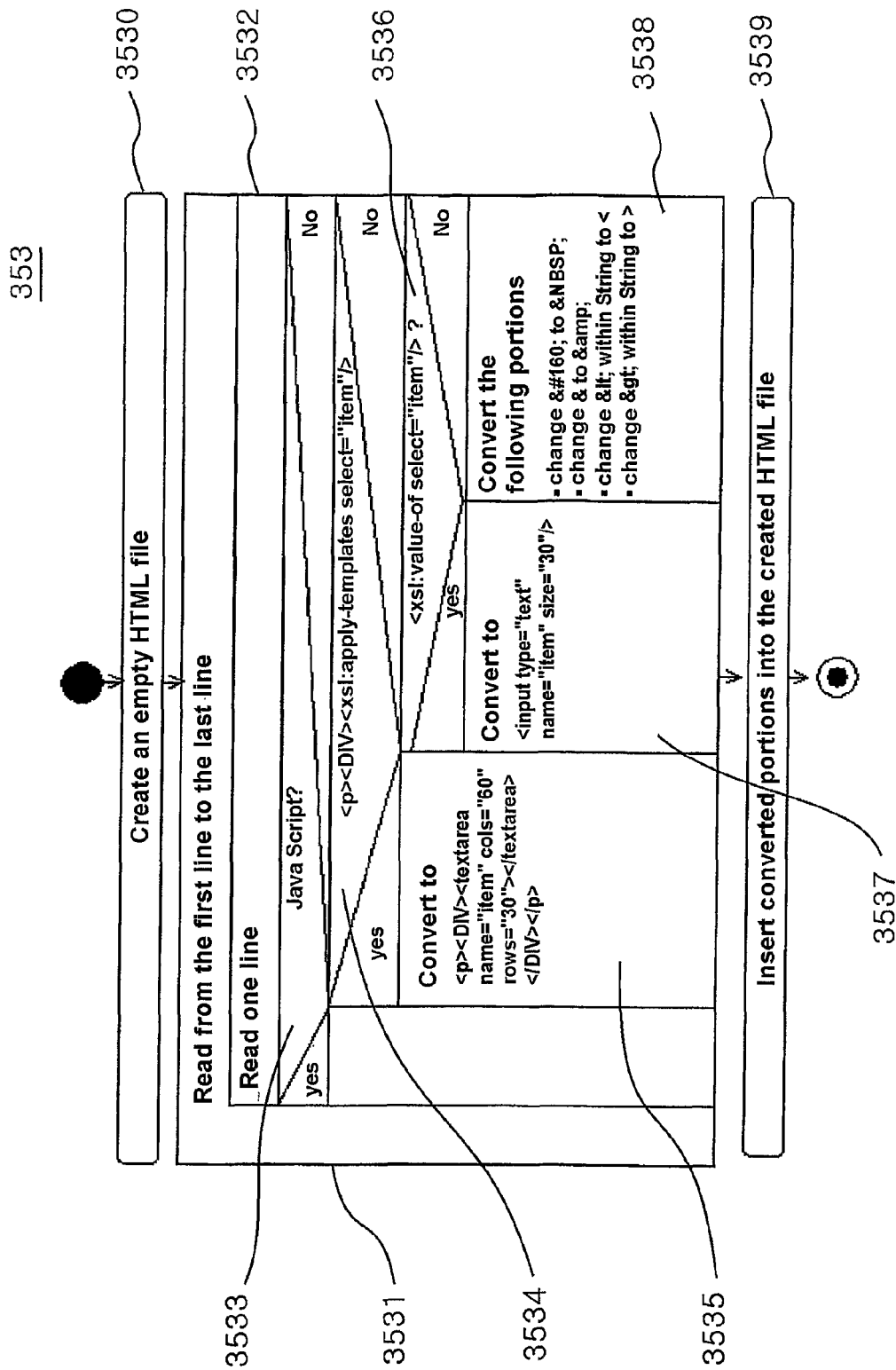
Figure 17:
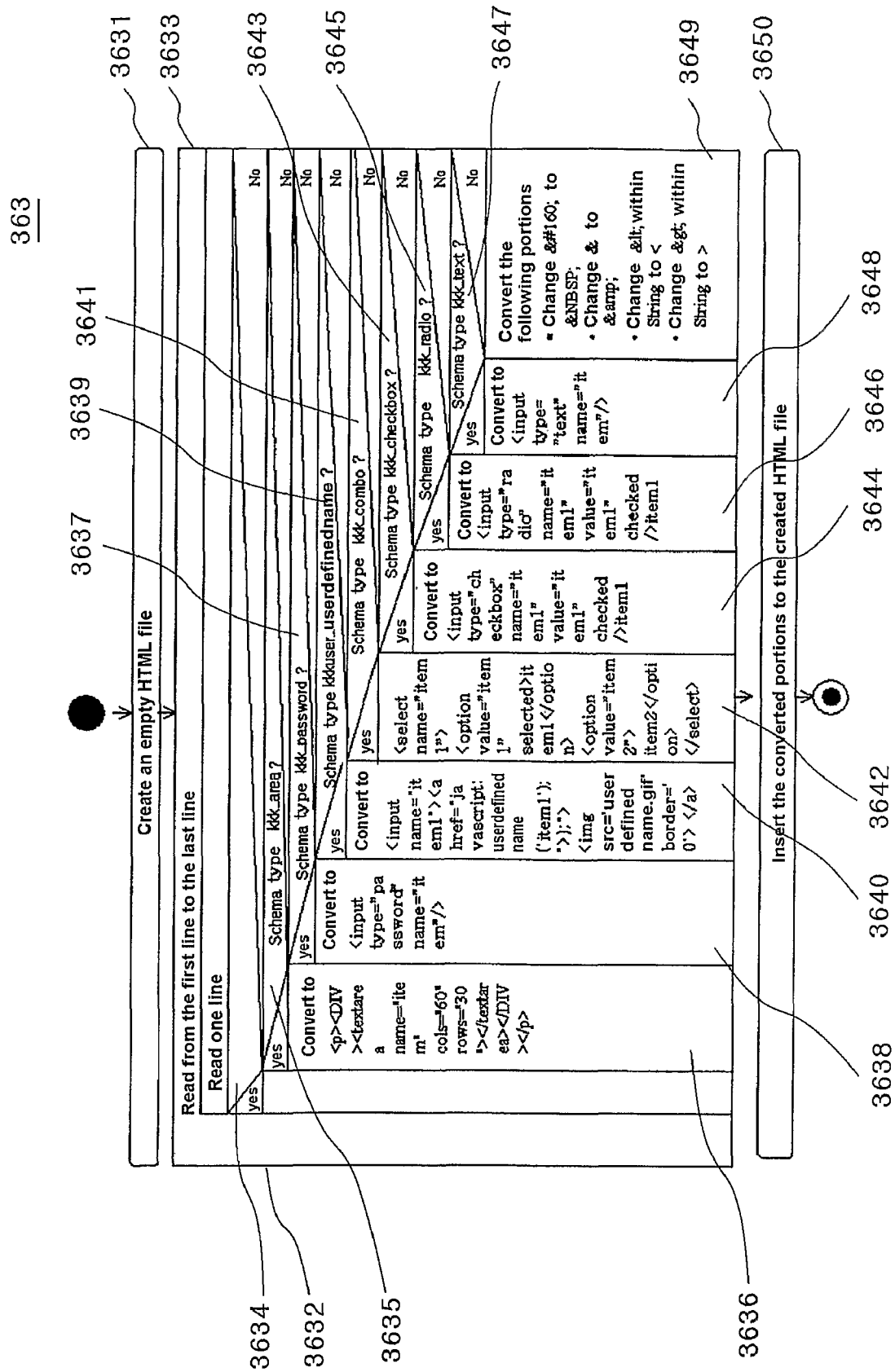

In FIGS. 15 to 17, a process 350 of creating a web form for inserting is shown in more detail, with which a user submits input data for creating an XML document, using a web browser. The web form file for inserting can be created from the source XSL file created in the mapping step 320 described in detail hereinabove. In step 351 of creating the web form for inserting as shown in FIG. 15 for step 350, the source maker opens a source XSL file corresponding to a desired source XML file to be made by means of the web form to be generated, using a tool program for automatically creating source files provided according to the invention. It is checked whether there is a corresponding schema file in step 352. In case of no, the tool can be operated to automatically create a web form file for inserting, in step 353 through the steps to be described in more detail hereinafter with reference to FIG. 16. It is checked whether there is an error in the created web form file in step 357 and the source maker then corrects the error in step 355 if there is one. The completed web form file for inserting can be stored in step 359 for later use.

In addition, when it is decided that there is a corresponding schema file in step 352, the tool opens the relevant schema file in step 361. The tool reads the opened schema file in step 362, and can automatically create a web form file for inserting in step 363 through the steps to be described hereinafter in more detail with reference to FIG. 17. The tool allows the source maker to check whether there is an error in the created web form file in step 366. If there is an error, the source maker can correct it in step 367. The completed web form file can be stored in step 368 for later use.

Referring to FIG. 16, the step 353 of automatically creating a web form file for inserting by the tool when there is no schema file, will be described. When the step 353 starts, an empty HTML file is created in step 3530. The tool reads the XSL file opened in the previous step 351 from the first line to the last line on a one by one line basis in step 3531. When reading one line in step 3532, it is checked whether the corresponding portion is a Java script in step 3533. In case of yes (that is, it is a Java script), the process proceeds with reading the next line. In case of no (that is, it is not a Java script), the following are checked in steps 3534 and 3536. Depending on the result of checking, proper conversion can be applied in steps 3535, 3537 and 3538. By, in step 3539, inserting the portions converted in the above into the empty HTML file already created, as a result a web form file for inserting can be created.

With reference to FIG. 17, the step 363 of automatically creating a web form file for inserting when there is a schema file, will be described. When the step 363 starts, the tool generates an empty HTML file in step 3631. The tool then reads the XSL file opened in the step 351 from the first line to the last line on a one by one line basis in step 3632. It is checked whether the portion read is a Java script in step 3634 or whether it conforms to the matters defined in the opened schema file in steps 3635, 3637, 3639, 3641, 3643, 3645 and 3647. Depending on the result of checking, proper conversion is applied in steps 3636, 3638, 3640, 3642, 3644, 3646, 3648 and 3649. In step 3650, the code converted as such is inserted into the empty HTML file generated in the previous step 3631 to create a web form file for inserting.

Herein, the schema file opened and used in the conversion process may be a file created through the step 330 described above with reference to FIGS. 11 and 12, or is preferably an external file referenced which is defining web forms. FIGS. 18 and 19 show some types of web forms that are defined in the schema file and can be shown in a created web form file. As shown in the FIGS. 18 and 19, web forms can be any type including all of the web forms typically known, e.g., the 'Text input web form' for inputting a short text, the 'Text area web form' for inputting long texts, the 'Password input web form' for inputting data requiring security such as a password, the 'File input web form' for attaching files, the 'Combo box web form' for selecting one of a plurality of predetermined data, etc.

Furthermore, the web forms that can be used according to the invention can include user-defined web forms. The 'user-defined web form' means a web form using a component defined by a user that may be a source maker. The 'user-defined web form' may include, e.g., the 'date input web form' for searching for a calendar and selecting a date, the 'postal code search web form' for inputting an address and then searching for a postcode or zip code corresponding to the input address. In order to implement such a 'user-defined web form', it is possible to create a web form for inserting to which a user-defined function is connected, for example, while a user-defined component function and a user-defined GIF (image of a call button to be displayed) are stored in advance in a server. As illustrated in FIGS. 18 and 19, the rule to use such a user-defined web form can be defined as, for example, 'kkkuser_userdefinedname'. For example, if the date selection web form is specified as kkkuser_calendar and the postcode search web form is specified as kkkuser_postcode, the elements illustrated in the following Table 1 can be used.

If those web forms are predefined in the schema file, a source code can be easily created on a one to one basis by the tool according to the invention. The schema file that predefines the web forms can be created to have the following source code shown in Source Code 7 by name of, for example, kkk_schema.xsd.

```
<Source Code 7>
<?xml version="1.0" encoding="UTF-8"?>
<xs:schema xmlns:xs="http://www.w3.org/2001/XMLSchema"
elementFormDefault="qualified" attributeFormDefault="unqualified">
    <xs:simpleType name="kkk_text">
        <xs:restriction base="xsd:string"/>
    </xs:simpleType>
    <xs:simpleType name="kkk_area">
        <xs:restriction base="xsd:string"/>
    </xs:simpleType>
    <xs:simpleType name="kkk_password">
        <xs:restriction base="xsd:string"/>
    </xs:simpleType>
    <xs:simpleType name="kkk_file">
        <xs:restriction base="xsd:string"/>
    </xs:simpleType>
    <xs:simpleType name="kkk_combo">
        <xs:restriction base="xsd:string">
            <xs:enumeration value="item1" />
            <xs:enumeration value="item2" />
        </xs:restrction>
    </xs:simpleType>
    <xs:simpleType name="kkk_radio">
        <xs:restriction base="xsd:string">
            <xs:enumeration value="item1" />
            <xs:enumeration value="item2" />
        </xs:restrction>
    </xs:simpleType>
    <xs:simpleType name="kkkuser_user_definedname">
        <xs:restrction base="xsd:string"/>
    </xs:simpleType>
</xs:schema>
```

In this example, kkk_schema.xsd is inserted as a link in a file created by means of the step of creating the schema file, as shown in the Source Code 4.

A web form file for inserting, created through the process of automatically creating the web form file for inserting, as described hereinabove, can be created as an HTML document. For example, a web form file for inserting can be created as sample.htm having the following source code shown in Source Code 8.

```
<Source Code 8>
<HTML>
<BODY>
<form method='POST' action='../../asp/./sample.asp?xml-File=
.../tw_doc/tw_form/./sample.xml'>
RESUME
<BR/>
<BR/>
```

TABLE 1

| User-defined name | Function | Image file of call button | Definition of schema | |
|---|---|---|---|---|
| kkkuser_userdefinedname | User-defined name ('item1') | user defined name.gif | kkkuser_userdefined name | |
| Ex. kkkuser_postcode | kkkuser_calendar calendar('item1') | calendar('item1') postcode.gif | calendar.gif kkkuser_postcode | kkkuser_calendar |

-continued

```
Name:  <imput type="text" name="item1" size="14"/>
<BR/>
Birth date:  <imput type="text" name="item2" size="14 "/>
<table align="center" border="0" cellpadding="0" cellspacing="0"
width="600" bgcolor="#FFFFFF">
<tr >
<td height="15" align="right" style="border-bottom:1 solid #000000">
  <div align="right"><br>
<input type='submit value="Save" >    
  </td>
</tr>
</table>
</form>
</BODY>
</HTML>
```

Figure 20:
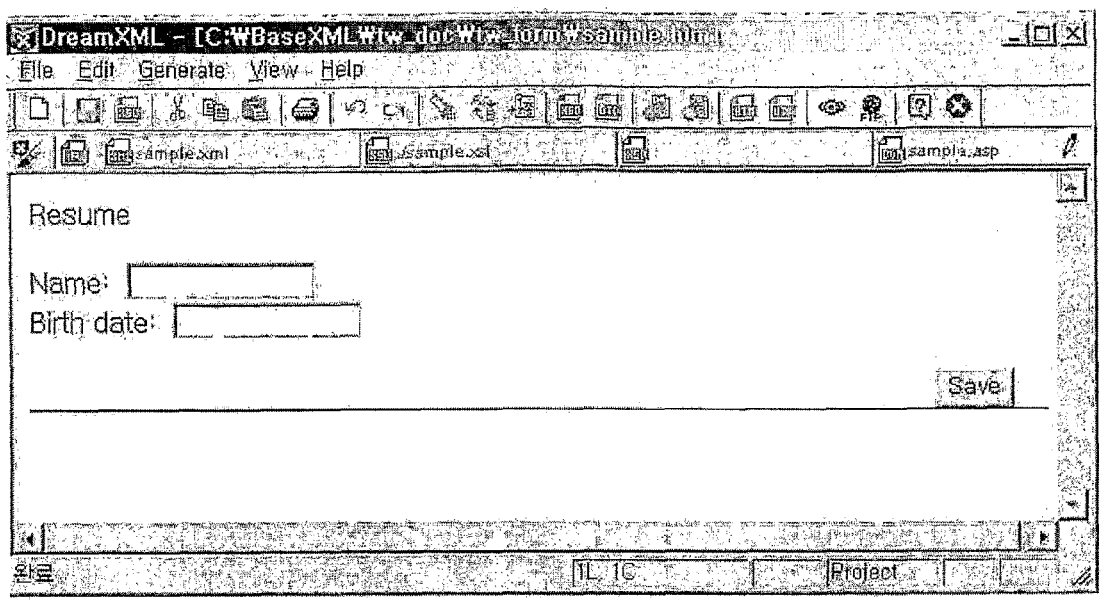

The web form for inserting as shown in Source Code 8 can be displayed on a user's web browser, as a window shown in FIG. 20. The illustrative example is only the simplest example for the purpose of brief description, and it should be noted that the present invention is not limited only to the illustrated example.

Figure 21:
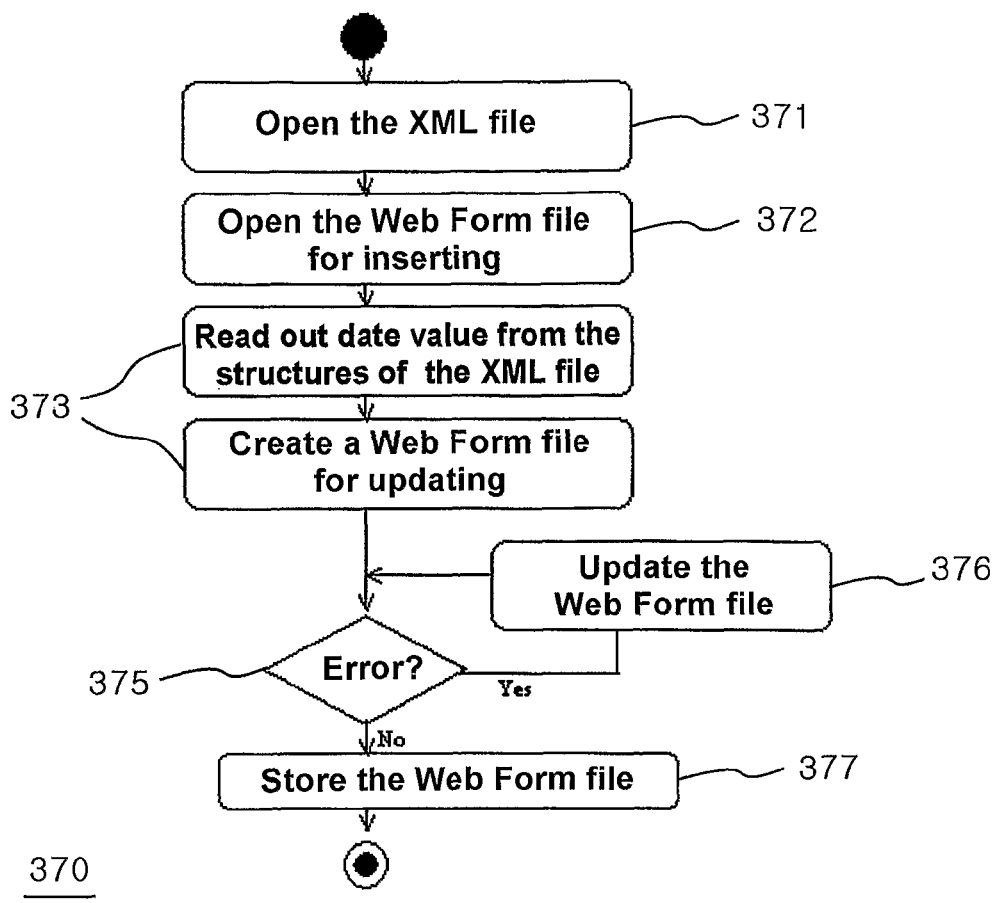
Figure 22:
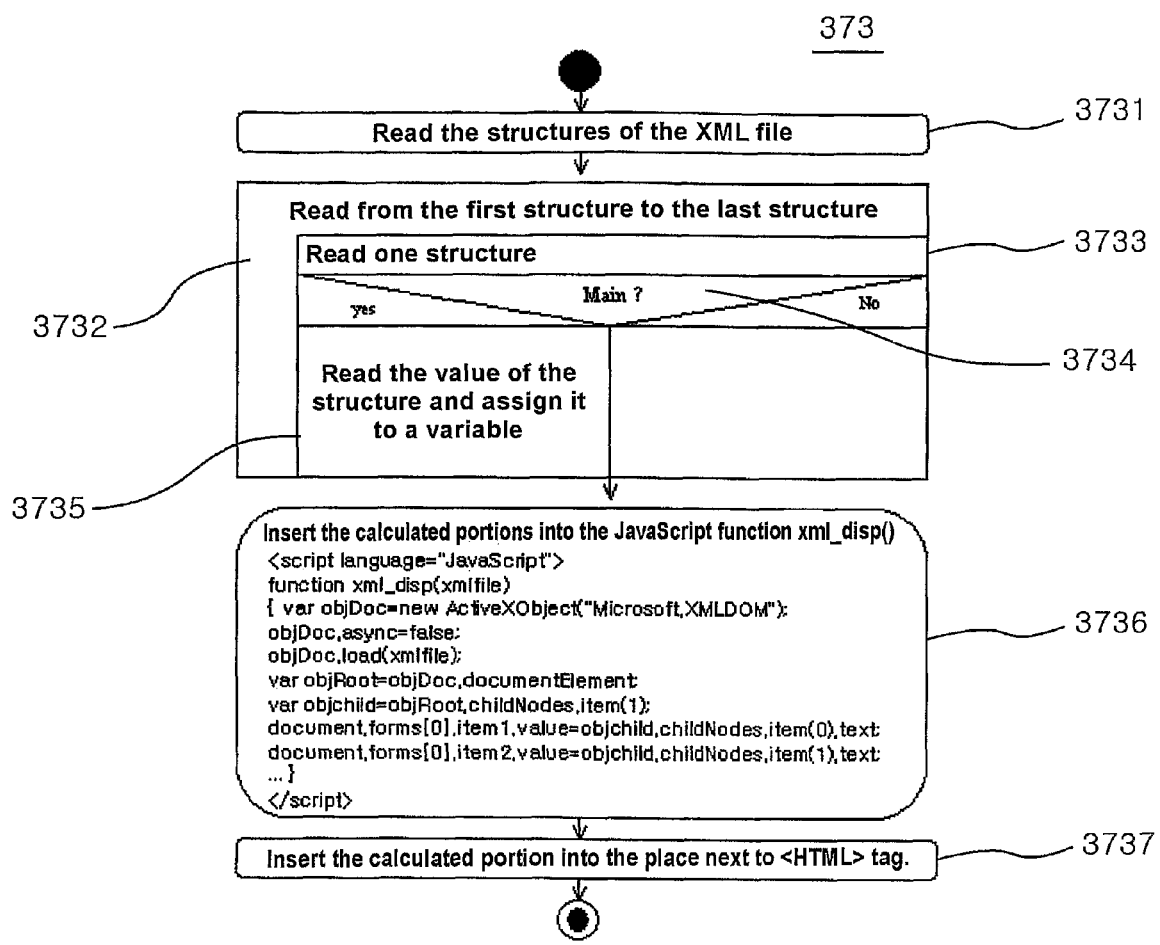

FIGS. 21 and 22 show the step 370 of creating a web form file for updating in detail. The web form file for updating a means to allow a user to modify the data in a corresponding XML document already created on a web browser. The web form file for updating is basically similar to the web form file for inserting. First, when the step 370 starts, a desired source XML file and a web form for inserting corresponding to the source XML file can be opened in steps 371 and 372. Data values are then read from the structure of the opened XML file and the web form file for updating can be automatically created in step 373. Errors are then checked in the created web form file for updating, in step 375. If there are errors in the file, they can be corrected in step 376. The completed web form file for updating can be stored in step 377 for later use. An example of a source code of the completed web form file for updating is shown in Source Code 9.

```
<Source Code 9>
var objchild=objRoot.childNodes.item(1);
document.forms[0].item1.value-objchild.childNodes.item(0).text;
document.forms[0].item2.value-objchild.childNodes.item(1).text;
}
</script>
<BODY onLoad="xml_disp('sample.xml')">
<form method='POST' action='../../asp/./sample.asp?xmlFile=
.../tw_doc/tw_form/./sample.xml'>
Resume
<BR/>
<BR/>
Name:  <imput type="text" name="item1" size="14"/>
<BR/>
Birth date:  <imput type="text" name="item2" size="14"/>
<table align="center" border="0" cellpadding="0" cellspacing="0"
width="600" bgcolor="#FFFFFF">
<tr >
<td height="15" align="right" style="border-bottom:1 solid #000000">
  <div align="right"><br>
<input type='submit value="Save" >    
  </td>
</tr>
</table>
</form>
</BODY>
</HTML>
```

The step 373 of automatically creating a web form file for updating will be described in more detail hereinafter with reference to FIG. 22. When the step 373 starts, the step of reading the structure of the XML file starts in step 3731. The structure of the XML file is read from the first structure to the last structure on a one by one structure basis in steps 3732 and 3733. The read structure is identified on what it is, for example, whether it is the Main element, in step 3734. The value of the corresponding structure is then inserted into a variable and calculated in step 3735, and the calculated portion is then inserted into the Java script function in step 3736. The result is then inserted into the empty HTML document in step 3737 to create a web form file for updating.

With the method according to the invention as described hereinabove, it is possible to automatically create source files, e.g., an XML file, an XSL file, a DTD/schema file, a DOM file, a web form file for inserting, and a web form for updating, from an original HTML document. Al of or at least a part of the steps of automatically creating the aforementioned source files can be implemented by means of a tool ('DreamXML TOOL') for automatically creating source files, which tool comprises software program instructions so that the tool can be executed, for example, on a local computer. The tool can further have a function for uploading the created source files to a web server computer via a local network or a wide area network including Internet. Furthermore, the tool can further have a function for modifying the source HTML document, creating a new HTML document, or converting a document in a different format to an HTML document. Thus, the preliminary process for creating an XML document according to the invention by aforementioned tool, can be completed.

Figure 23:
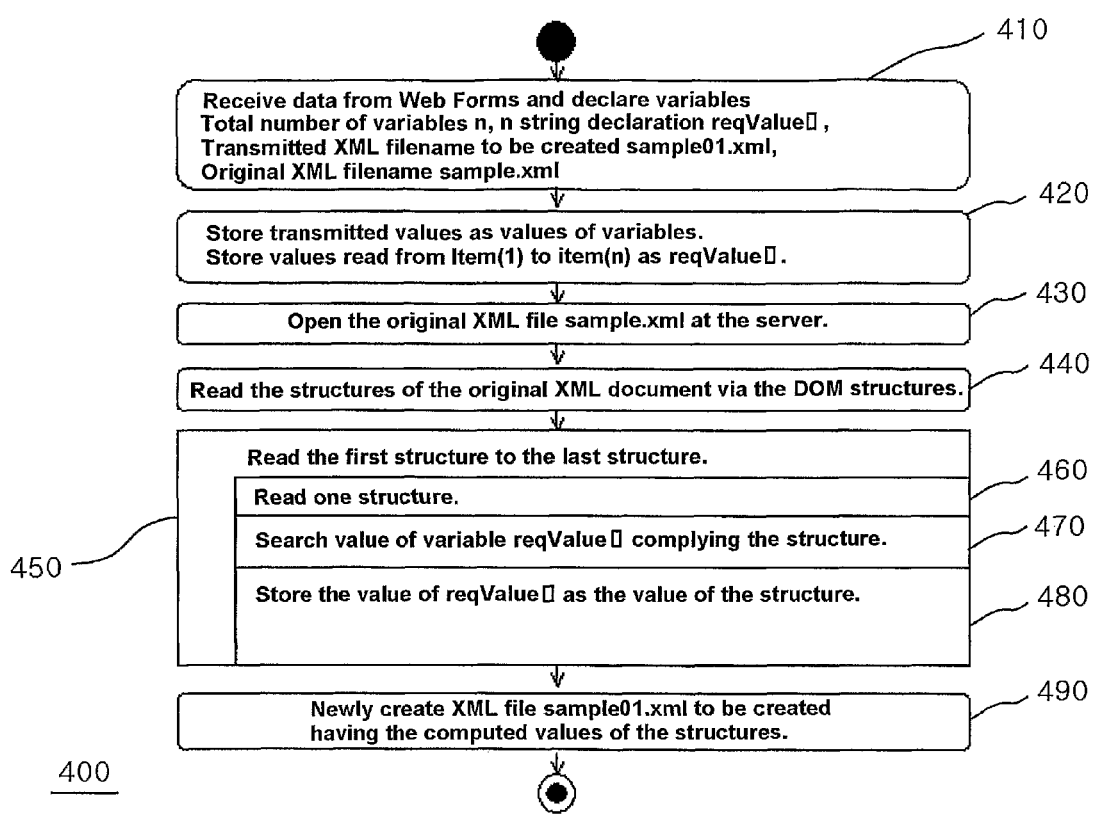
FIG. 23 shows a flow chart for describing, in more detail, the process in an engine for automatically creating an XML document, using the data transmitted by a user using a web form in the method of automatically creating the XML document according to one embodiment of the invention.

While the source files have been uploaded to the web server computer, a user selects a desired web form among the web forms provided by the web server to easily create a desired document as an XML document. FIG. 23 shows, in detail, the process 400 of creating such an XML document, as the process 400 is executed in the server. The process 400 may be carried out via an engine that may be a program executed in the server. When creating an XML document, as described above, the user first selects a web form for entering her/his desired data with a web browser and then enters the data required in the web form. The input data are transmitted to the server when the user clicks the Submit button placed in the web form.

When the data input by the user are transmitted to the server, the process 400 of creating an XML document shown in FIG. 23 may start. The engine first receives the data from the web form and declares variables in step 410, and then stores the transmitted data values in the declared variables in step 420. The engine then opens the source XML file in the server, corresponding to the web form for inserting in step 430, which web form was used by the user to transmit the input data. The engine then reads the structures of the source XML file, using a corresponding DOM file, in step 440. In this case, the structure is read from the first structure to the last structure on a one by one structure basis, in steps 450 and 460. When it finishes reading one structure, the engine searches for a variable value matching to the corresponding structure in step 470, and stores the searched value as a value of the corresponding structure in step 480. The engine then stores the XML file having the structure values calculated as such, as a newly created XML document in step 490.

According to the aforementioned process, the data input by the user can be inserted into the structures duplicated from the source XML file already stored, and a new XML document having the same structure as the source XML file but having different data can thereby be duplicated-generated.

Figure 24:
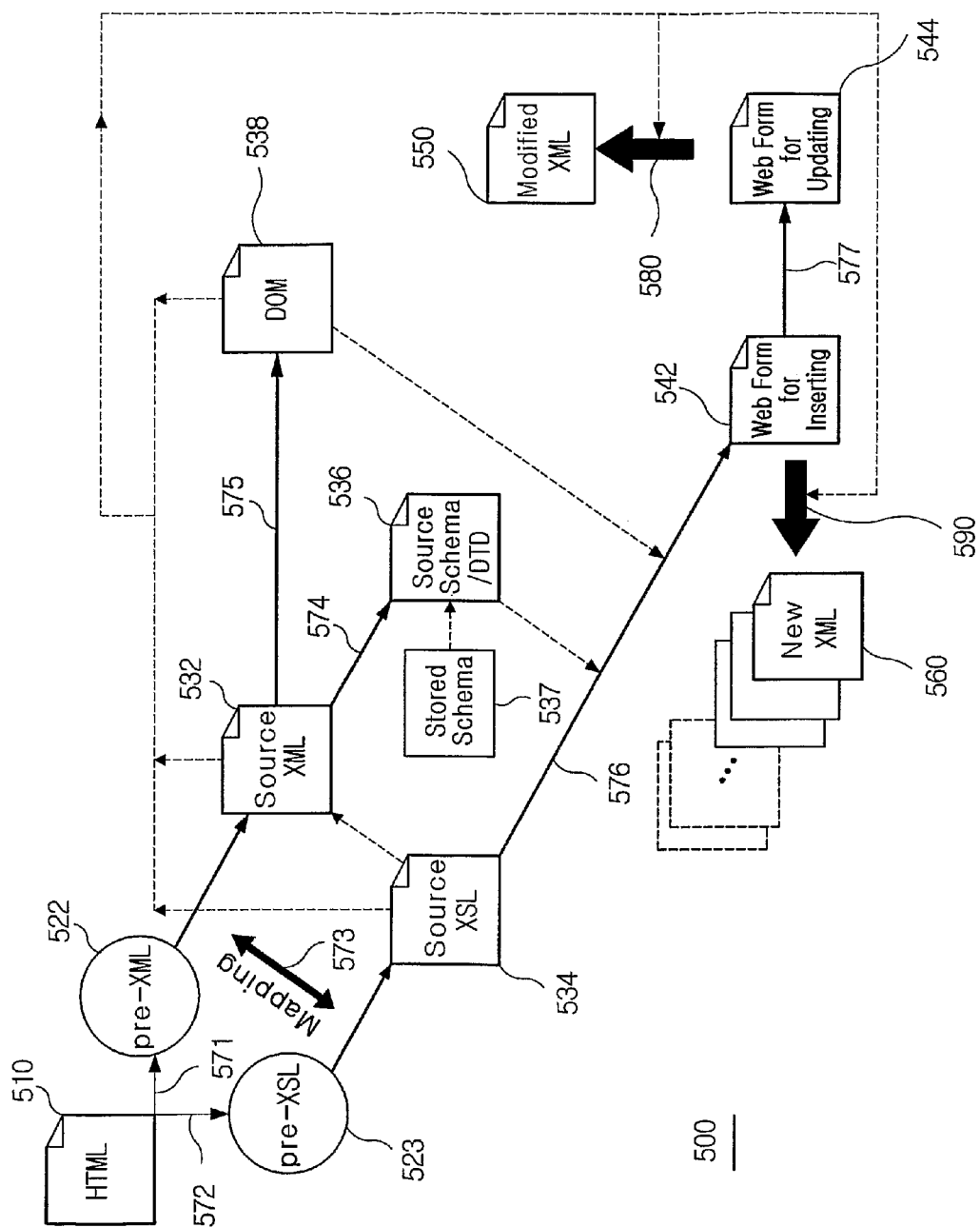
FIG. 24 shows a conceptual flow chart for illustrating overall steps of creating an XML document in each step in the method of automatically creating the XML document according to one embodiment of the invention.

FIG. 24 schematically shows a relation 500 between different files/documents to be involved when creating an XML document according to the invention. According to the invention, the original HTML document 510 is associated with the preliminary XML file 522 and the preliminary XSL file 523 through the steps 571 and 572 of automatically creating the files 522 and 523. The two files 522 and 523 are converted to the source XML file 532 and the XSL file 534 to be converted through the mapping process 573 by the source maker. The source XML file 532 is associated with the steps 575 and 574 of automatically creating the DOM file 538 and the schema/DTD file 536. In this case, the schema file 537, in which web form input structures are predefined, may have been already stored. The source XSL file 534 is associated with the web form file 542 for inserting through the step 576 of automatically creating the web form file 542. The web form file for updating 544 is associated with the web form file 542 for inserting through the automatic creation step 577. The user enters data required in the web form file for inserting 542 and the data can be created as a new XML file 560 on the basis of the DOM file 538 and the source XML file 532 by means of the engine (BaseXML Engine) in the server in step 590. The web form for updating 544 can be used by the user in order to correct errors in a new XML file created as described hereinabove and then to create a corrected XML file 550 in step 580.

Hereinabove, the invention was described with specific embodiments with reference to accompanying drawings, but it should be noted that the spirit and scope of the invention shall not be limited only to the illustrated examples. For example, the method of automatically creating an XML document according to the invention was described that can be implemented on a network comprising a server and a client, that is, on a communication network using TCP/IP and HTTP protocols. However, it is not intended that the invention should be implemented only on such a network. The automatic source creation tool and the automatic XML document creation and duplication process provided according to the invention can be implemented as a set of software that can be executed on one local computer to which any user can access or on a local area network in which a plurality of computers are connected to one another.

The software programs of the tool and the engine for implementing the method according to the invention can be stored on a computer-readable medium, such as a recording medium, e.g., a CD-ROM disc, DVD-ROM disc, RAM, ROM, floppy disc, hard disc, magneto-optical disc, optical recording medium, etc., and then can be read and executed by a microprocessor installed in a computer.

Furthermore, the steps for automatically creating source files illustrated and described herein are only for illustration and it is not intended to limit the spirit of the invention. It should be noted that those skilled in the art can easily conceive different variations and modifications different from the invention as describe above, if required on the basis of the spirit of the invention, without departing from the scope of the invention, as claimed in the following claims. Therefore, it should also be noted that the protective scope of the invention shall be construed by means of the following claims, not by means of the specific embodiment disclosed hereinabove.

The invention claimed is:

1. A method for creating a new extensible markup language (XML) document on a web browser, said method comprising the steps of:
  converting an HTML document to create a source XML document stored in advance;
  receiving an input of data from said web browser;
  duplicating the source XML document stored in advance, said source XML document having predefined structures and including predetermined source data according to said predefined structures;
  replacing said source data included in said duplicated XML document with said received input data; and
  storing said XML document that results from said replacement step as said new XML document.

2. The method as set forth in claim 1, wherein said input of data received in said receiving step is transmitted by a web page, said web page including at least a form input structure that allows said data to be input.

3. A method for creating a new extensible markup language (XML) document on a web browser, said method comprising the steps of:
  receiving an input of data from said web browser;
  duplicating a source XML document stored in advance, said source XML document having predefined structures and including predetermined source data according to said predefined structures;
  replacing said source data included in said duplicated XML document with said received input data;
  storing said XML document that results from said replacement step as said new XML document; and
  wherein said step of replacing said source data in said duplicated XML document with said received input data is carried out by a document object model (DOM) file that can access said predefined structures of said source XML document and can set up data values, wherein said DOM file has been created and stored prior to creation of said source XML document.

4. The method as set forth in claim 3, wherein said input of data received in said receiving step is transmitted by a web page, said web page including at least a form input structure that allows said data to be input.

5. A method for creating sources for automatically creating a document in a first hierarchical structure, said method comprising the steps of:
  automatically creating a document in a first preliminary hierarchical structure using data transmitted from an original document in a second hierarchical structure;
  automatically creating a preliminary stylesheet document associated with said document in said first preliminary hierarchical structure;
  mutually mapping said document in said first preliminary hierarchical structure and said preliminary stylesheet document;
  automatically creating a type definition and validity verification means from said document in said first hierarchical structure, wherein said type definition and validity verification means that is associated with said document in said first hierarchical structure is able to define a data type of said document in said first hierarchical structure and verify data type validity;
  automatically creating a data value setup means from said document in said first hierarchical structure, wherein said data value setup means is able to access and set up data values of said first hierarchical structure of said document, said data value setup means being associated with said document in said first hierarchical structure; and
  automatically creating a document in said second hierarchical structure for inserting from said stylesheet document and said type definition and validity verification document, wherein said document created in said second hierarchical structure allows for a new document in said first hierarchical structure to be created by sending input data to said data value setup document.

6. The method as set forth in claim 5, said method further comprising the step of creating, opening, or editing an original document in said second hierarchical structure.

7. The method as set forth in claim 5, said method further comprising the step of automatically creating a document in said second hierarchical structure for updating from said document in said second hierarchical structure for inserting, wherein said document for updating allows said data in said new document in said first hierarchical structure to be modified.

8. The method as set forth in claim 5, wherein said document in said first hierarchical structure is an XML document.

9. The method as set forth in claim 5, wherein said document in said second hierarchical structure for inserting is a hypertext markup language (HTML) document having at least a form input portion.

10. The method as set forth in claim 5, further comprising the step of uploading said sources means for automatically creating new documents in said first hierarchical structure, to the server.

11. The method as set forth in claim 5, wherein said stylesheet document is an XSL document.

12. The method as set forth in claim 5, wherein said type definition and validity verification means is a data type definition (DTD) or schema document.

13. The method as set forth in claim 5, wherein said data value setup means is a DOM configured as a server side script page.

14. A computer-readable recording medium on which a program is recorded, said program comprising instructions to automatically create XML documents having given structures on a web browser, said instructions instructing said web browser to carry out at least the following steps:
- converting an HTML document to create a source XML document stored in advance;
- receiving an input of data from said web browser;
- duplicating the source XML document stored in advance, said source XML document having predefined structures and including predetermined source data according to said predefined structures;
- replacing said source data included in said duplicated XML document with said received input data; and
- storing said XML document that results from said replacement step as said new XML document.

15. A computer-readable recording medium on which a program is recorded, said program comprising instructions to automatically create XML documents having given structures on a web browser, said instructions instructing said web browser to carry out at least the following steps of:
- automatically creating a document in a first preliminary hierarchical structure using data transmitted from an original document in the said second hierarchical structure;
- automatically creating a preliminary stylesheet document associated with said document in said first preliminary hierarchical structure;
- mutually mapping said document in said first preliminary hierarchical structure and said preliminary stylesheet document;
- automatically creating a type definition and validity verification means from said document in said first hierarchical structure, wherein said type definition and validity verification means that is associated with said document in said first hierarchical structure is able to define a data type of said document in said first hierarchical structure and verify data type validity;
- automatically creating a data value setup means from said document in said first hierarchical structure, wherein said data value setup means is able to access and set up data values of said first hierarchical structure of said document, said data value setup means being associated with said document in said first hierarchical structure; and
- automatically creating a document in said second hierarchical structure for inserting from said stylesheet document and said type definition and validity verification document, wherein said document created in said second hierarchical structure allows for a new document in said first hierarchical structure to be created by sending input data to said data value setup document.

* * * * *